(12) United States Patent
Chang et al.

(10) Patent No.: US 10,186,041 B2
(45) Date of Patent: *Jan. 22, 2019

(54) APPARATUS AND METHOD FOR ANALYZING GOLF MOTION

(71) Applicant: ELECTRONICS AND TELECOMMUNICATIONS RESEARCH INSTITUTE, Daejeon (KR)

(72) Inventors: Ju-Yong Chang, Daejeon (KR); Soon-Chan Park, Daejeon (KR); Ji-Young Park, Daejeon (KR); Jin-Seo Kim, Daejeon (KR); Hee-Kwon Kim, Daejeon (KR); Kwang-Hyun Shim, Daejeon (KR); Moon-Wook Ryu, Seoul (KR); Ho-Wook Jang, Daejeon (KR); Hyuk Jeong, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 259 days.

This patent is subject to a terminal disclaimer.

(21) Appl. No.: 15/078,280

(22) Filed: Mar. 23, 2016

(65) Prior Publication Data

US 2016/0296795 A1 Oct. 13, 2016

(30) Foreign Application Priority Data

Apr. 9, 2015 (KR) .................. 10-2015-0050019
Jan. 20, 2016 (KR) .................. 10-2016-0006966

(51) Int. Cl.
*G06K 9/00* (2006.01)
*G06T 7/20* (2017.01)
*G06T 7/246* (2017.01)

(52) U.S. Cl.
CPC ............ *G06T 7/20* (2013.01); *G06K 9/00342* (2013.01); *G06T 7/251* (2017.01);
(Continued)

(58) Field of Classification Search
None
See application file for complete search history.

(56) References Cited

U.S. PATENT DOCUMENTS 8,142,300 B2 * 3/2012 Iwatsubo ........... A63B 24/0003
473/222
8,175,326 B2 * 5/2012 Siegel ................ G06K 9/00342
382/100

(Continued)

FOREIGN PATENT DOCUMENTS

KR 10-2012-0021848 A 3/2012
KR 10-1394276 B1 5/2014

OTHER PUBLICATIONS

Huang et al., "A golf swing analysis system using Wii balance board and Kinect sensors for novice players", Multimed Tools Appl (2015) 74:10679-10696, Jul. 24, 2014.*

(Continued)

*Primary Examiner* — Soo Jin Park
(74) *Attorney, Agent, or Firm* — LRK Patent Law Firm

(57) ABSTRACT

An apparatus and method for analyzing a golf motion. The apparatus includes acquiring, by an image sensor of a camera unit, a 2D image of motion of a user, acquiring, by a depth sensor of the camera unit, a depth image to temporally alternate with acquisition of the 2D image, the depth image including depth values of pixels in the 2D image, increasing an image-capturing speed by generating a corresponding depth image or a corresponding 2D image, which corresponds to a reference 2D image or a reference depth image acquired at a predetermined time, outputting the reference 2D image and the corresponding depth image or (Continued)

the reference depth image and the corresponding 2D image as output data for motion analysis, extracting skeletal information of the user through analysis of output data, and displaying motion of the user on a display unit based on skeletal information.

19 Claims, 30 Drawing Sheets

(52) U.S. Cl.
CPC ............... *G06T 2207/10016* (2013.01); *G06T 2207/10028* (2013.01); *G06T 2207/30221* (2013.01)

(56) References Cited

U.S. PATENT DOCUMENTS

| | | | | |
|---|---|---|---|---|
| 8,696,450 | B2* | 4/2014 | Rose | G09B 19/0038 |
| | | | | 463/30 |
| 8,894,500 | B2* | 11/2014 | Ueda | A63B 69/36 |
| | | | | 473/131 |
| 9,011,293 | B2* | 4/2015 | Shavit | A63B 71/0622 |
| | | | | 482/8 |
| 9,299,158 | B2* | 3/2016 | Hanish | G06T 7/246 |
| 9,466,110 | B2* | 10/2016 | Ishige | G06T 7/004 |
| 9,589,207 | B2* | 3/2017 | Holohan | G06K 9/00342 |
| 2009/0191985 | A1 | 7/2009 | Jang et al. | |
| 2012/0190505 | A1* | 7/2012 | Shavit | A63B 71/0622 |
| | | | | 482/8 |
| 2013/0158966 | A1 | 6/2013 | Baek et al. | |
| 2013/0250118 | A1* | 9/2013 | Kawakami | H04N 7/183 |
| | | | | 348/157 |
| 2014/0342844 | A1* | 11/2014 | Mooney | G06K 9/00342 |
| | | | | 473/266 |
| 2015/0072797 | A1* | 3/2015 | Sakyo | A63B 24/0006 |
| | | | | 473/223 |
| 2015/0111657 | A1* | 4/2015 | Shibuya | G06K 9/00342 |
| | | | | 473/223 |
| 2015/0231444 | A1* | 8/2015 | Stephenson | A63B 24/0003 |
| | | | | 700/92 |
| 2015/0367174 | A1* | 12/2015 | Okazaki | A63B 24/0003 |
| | | | | 473/409 |

OTHER PUBLICATIONS

Zhang, "Microsoft Kinect sensor and its effect", IEEE Multimed 19:4-10, 2012.*

Chun et al., "A sensor-aided self coaching model for uncocking improvement in golf swing", Multimed Tools App (2014) 72:253-279.*

Kumada et al., "Golf swing tracking and evaluation using Kinect sensor and particle filter", ISPACS 2013.*

\* cited by examiner

APPARATUS AND METHOD FOR ANALYZING GOLF MOTION

CROSS REFERENCE TO RELATED APPLICATIONS

This application claims the benefit of Korean Patent Application Nos. 10-2015-0050019, filed Apr. 9, 2015 and 10-2016-0006966, filed Jan. 20, 2016, which are hereby incorporated by reference in their entirety into this application.

BACKGROUND OF THE INVENTION

1. Technical Field

The present invention generally relates to an apparatus and method for analyzing a golf motion and, more particularly, to an apparatus and method for analyzing a golf motion, which can efficiently implement high-speed image capturing, and can provide more accurate and various information to a user by precisely analyzing motion through the extraction of skeletal information.

2. Description of the Related Art

Golf is a sport in which posture is more important than force. The posture of golf is internalized through muscle memory. To accurately internalize the posture, a procedure for practice and correction must be continuously repeated.

Meanwhile, assistant systems for allowing a correction procedure, which was conventionally performed by the coaching of experts, to be performed via self-training are camera-based golf motion analysis systems which have recently been introduced. Such a camera-based golf motion analysis system is composed of a camera unit for capturing images of golf motion and an analysis unit for analyzing the captured images. The conventional camera-based golf motion analysis system has several problems.

First, some motions in golf swing are performed at high speed, but the conventional camera-based golf motion analysis system is problematic in that some fast motions cannot be desirably captured due to the limited image-capturing speed of the camera. To solve this problem, a golf motion analysis system using a high-speed camera has been developed, but this is limited in commercialization from the standpoint of expense.

A problem attributable to some fast golf swing motions is also found in the analysis unit. In order to provide real-time information to a user, the analysis unit must have image processing performance that surpasses the image-capturing speed of a camera. However, a problem arises in that computing equipment does not have such image processing performance, thus making it impossible to provide real-time information to the user. To overcome this problem, a system equipped with high-performance computing equipment has also been presented, but this system is limited in commercialization from the standpoint of expense and efficiency.

The conventional systems are also limited as to techniques for analyzing the captured images because information extracted by the systems from images is not suitable for motion analysis. For example, such a conventional system analyzes a golf motion in such a way as to recognize the contour line of the human body, extract body parts, and display lines or figures at the positions of body parts specified in this way. However, according to this scheme, there is a limitation in that a body part cannot be accurately isolated, or the bending angle of an arm cannot be exactly recognized in a portion in which body parts overlap each other (e.g. when a front image is captured, a portion in which the arms and the upper part of a body overlap each other at an address posture).

In relation to this, Korean Patent Application Publication No. 2012-0021848 discloses technology entitled "System for Golf Swing Posture Exercise and Correction".

SUMMARY OF THE INVENTION

Accordingly, the present invention has been made keeping in mind the above problems occurring in the prior art, and an object of the present invention is to provide a system for analyzing a golf motion, which enables high-speed image capturing to be efficiently implemented.

Another object of the present invention is to provide more accurate and various information to a user by precisely analyzing the motion of the user.

A further object of the present invention is to enable the stable analysis of a fast motion section while providing real-time information to the user, when analyzing a golf swing including a fast motion.

In accordance with an aspect of the present invention to accomplish the above objects, there is provided a method for analyzing a golf motion, including acquiring, by an image sensor of a camera unit, a 2D image of a motion of a user; acquiring, by a depth sensor of the camera unit, a depth image to temporally alternate with acquisition of the 2D image, the depth image including depth values of respective pixels in the 2D image; increasing an image-capturing speed by generating a corresponding depth image or a corresponding 2D image, which corresponds to a reference 2D image or a reference depth image acquired at a predetermined time; outputting the reference 2D image and the corresponding depth image or the reference depth image and the corresponding 2D image as output data for motion analysis; extracting skeletal information of the user through analysis of the output data; and displaying the motion of the user on a display unit based on the skeletal information.

Increasing the image-capturing speed may include acquiring, by the depth sensor, a first depth image at a first time; acquiring, by the image sensor, a first 2D image as the reference 2D image at a second time after the first time; generating a second depth image at the first time by projecting the first depth image on a viewpoint of the image sensor; estimating a motion vector between the first 2D image and the second depth image; rendering a third depth image projected at the second time from the second depth image using the motion vector; and generating a fourth depth image at the second time as the corresponding depth image by projecting the third depth image on a viewpoint of the depth sensor, wherein outputting the reference 2D image and the corresponding depth image or the reference depth image and the corresponding 2D image is configured to output the first 2D image and the fourth depth image as output data.

Increasing the image-capturing speed may include acquiring, by the image sensor, a first 2D image at a first time; acquiring, by the depth sensor, a first depth image as the reference depth image at a second time after the first time; generating a second depth image by projecting the first depth image on a viewpoint of the image sensor; estimating a motion vector between the first 2D image and the second depth image; and rendering a second 2D image at the second time as the corresponding 2D image from the first 2D image using the motion vector, wherein outputting the reference 2D image and the corresponding depth image or the reference depth image and the corresponding 2D image is configured to output the first depth image and the second 2D image as output data.

Extracting the skeletal information may include extracting pixel data of the output data; performing user area setting by selecting pixels in a user area corresponding to the user based on the pixel data; calculating a probability distribution value indicating whether each of the pixels included in the user area corresponds to a skeleton joint; defining predetermined pixels as a skeleton joint based on the probability distribution value; defining a center point of the predetermined pixels defined as the skeleton joint; and completing and extracting the skeletal information based on the center point.

Each of defining as the skeleton joint and defining the center point may include decreasing a resolution of the pixel data, defining a skeleton joint and a center point based on low resolution; increasing the resolution of the pixel data; setting an area ranging a predetermined distance from the center point derived based on the low resolution; and newly defining skeleton joints and a center point based on the pixels in the area.

The pixel data may be at least one of depth information, an RGB value, and an illuminance value of each pixel.

Outputting the reference 2D image and the corresponding depth image or the reference depth image and the corresponding 2D image may be configured to adjust an amount of output data for motion analysis according to a motion speed of the user.

Outputting the reference 2D image and the corresponding depth image or the reference depth image and the corresponding 2D image may be configured to, when a motion speed of the user is less than a preset value, output all of the reference 2D image and the corresponding depth image or the reference depth image and the corresponding 2D image in real time as the output data for motion analysis; and when the motion speed of the user is equal to or greater than the preset value, extract part of the reference 2D image and the corresponding depth image or the reference depth image and the corresponding 2D image, and output the extracted image as the output data for motion analysis.

Outputting the reference 2D image and the corresponding depth image or the reference depth image and the corresponding 2D image may be configured to, when the motion speed of the user is equal to or greater than the preset value, and then part of the reference 2D image and the corresponding depth image or the reference depth image and the corresponding 2D image is extracted and output as the output data for motion analysis, store remaining data and output the remaining data as the output data for motion analysis when the motion speed of the user is changed to a value less than the preset value.

Displaying the motion of the user may be configured to display a motion of the user, differing from a preset reference motion by a predetermined value or more, among motions of the user.

In accordance with another aspect of the present invention to accomplish the above objects, there is provided a method for analyzing a golf motion, including acquiring, by an image sensor of a camera unit, a 2D image of a golf motion of a user; acquiring, by a depth sensor of the camera unit, a depth image including depth values of respective pixels in the 2D image; extracting skeletal information of the user through analysis based on the 2D image and the depth image; and displaying positions of joints of the user on a display unit based on the 2D image and the skeletal information.

Acquiring the depth image may be configured to acquire the depth image to alternate with acquisition of the 2D image, and the method may further include increasing an image-capturing speed by generating a corresponding depth image or a corresponding 2D image, which corresponds to a reference 2D image or a reference depth image acquired at a predetermined time.

Extracting the skeletal information may be configured to extract the skeletal information of the user to include skull information of the user, and displaying the positions of the joints may be configured to display movement of a head from an address section to an impact section in a golf motion of the user.

Extracting the skeletal information may be configured to calculate a value corresponding to a distance between feet based on position values of joints of ankles of the user through analysis of the output data, and displaying the positions of the joints may be configured to display the distance between the feet in a golf motion of the user.

Extracting the skeletal information may be configured to calculate coordinates of a center of gravity of the user and coordinates of a joint of a right foot or a left foot, and displaying the positions of the joints may be configured to display the center of gravity and a position of the joint of the right or left foot during a backswing section or a downswing section in the golf motion of the user.

Extracting the skeletal information may be configured to calculate a value corresponding to an angle of an arm based on coordinates of joints of shoulders, elbows, and hands, and displaying the positions of the joints may be configured to display a line connecting the joints of the shoulders, elbows, and hands during an impact section in the golf motion of the user.

Extracting the skeletal information may be configured to calculate a value corresponding to a reverse spine angle based on coordinates of the head and left/right sides of a pelvis, and displaying the positions of the joints may be configured to display a line connecting a left or right foot and a center of the left/right sides of the pelvis during a backswing section in the golf motion of the user.

In accordance with a further aspect of the present invention to accomplish the above objects, there is provided an apparatus for analyzing a golf motion, including a camera unit including an image sensor for acquiring a 2D image of a motion of a user and a depth sensor for acquiring a depth image to temporally alternate with acquisition of the 2D image, the depth image having depth values of respective pixels in the 2D image; a control unit for generating a corresponding depth image or a corresponding 2D image, which corresponds to a reference 2D image or a reference depth image, acquired at a predetermined time by the camera unit, an output unit for outputting the reference 2D image and the corresponding depth image or the reference depth image and the corresponding 2D image as output data; an extraction unit for extracting skeletal information of the user through analysis of the output data; and a display unit for displaying the motion of the user based on the skeletal information.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
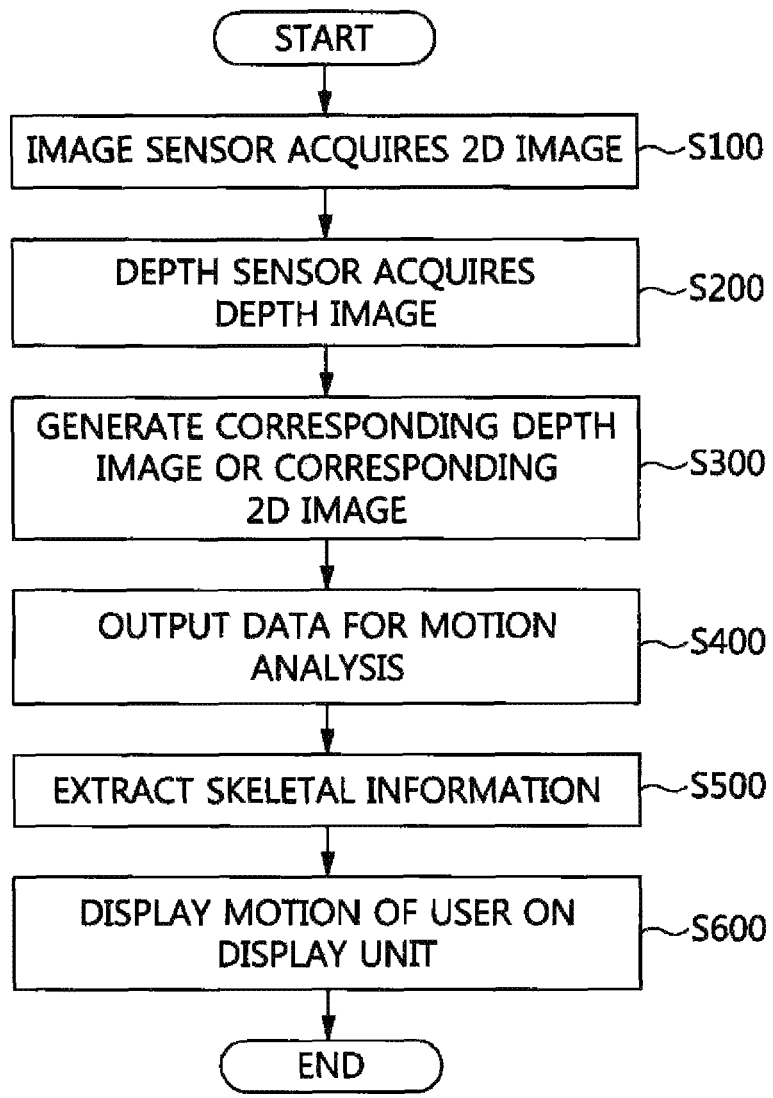
FIG. 1 is a flowchart showing a method for analyzing a golf motion according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, a method for analyzing a golf motion according to an embodiment of the present invention will be described in detail with reference to the attached drawings.

FIG. 1 is a flowchart showing a method for analyzing a golf motion according to an embodiment of the present invention.

Referring to FIG. 1, in the golf motion analysis method according to the embodiment of the present invention, the image sensor of a camera unit acquires a two-dimensional (2D) image of the motion of a user at step S100.

Figure 2:
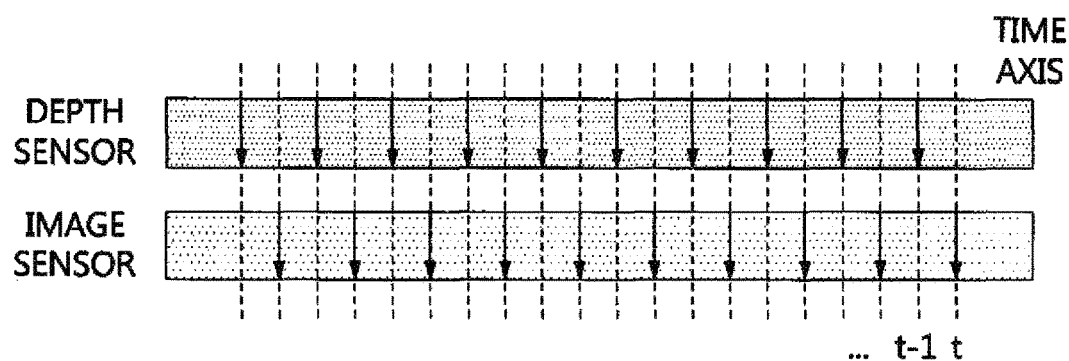
FIG. 2 is a diagram showing the timing of image acquisition by the depth sensor and the image sensor of a camera unit in the golf motion analysis method according to an embodiment of the present invention.

Further, to temporally alternate with the acquisition of the 2D image at step S100, the depth sensor of the camera unit acquires a depth image, which includes the depth values of respective pixels in the 2D image, at step S200. FIG. 2 is a diagram showing the timing of image acquisition by the depth sensor and the image sensor of the camera unit in the golf motion analysis method according to the embodiment of the present invention. In FIG. 2, individual arrows indicate the times at which images are acquired, and the concept in which the depth sensor and the image sensor temporally alternately acquire images at steps S100 and S200 is depicted. For example, when a 2D image is acquired at time t−1, a depth image may be acquired at time t, whereas when a depth image is acquired at time t−1, a 2D image may be acquired at time t.

Thereafter, a corresponding depth image or a corresponding 2D image, which corresponds to a reference 2D image or a reference depth image acquired at a predetermined time, is generated at step S300. That is, at step S300, the camera unit may increase the frame rate (the number of frames per unit time) of each image by combining the 2D image acquired by the image sensor, for example, an RGB image, with the depth image acquired by the depth sensor. The camera unit may double the actual image-capturing speed by combining a first 2D image and a first depth image, which are alternately acquired through alternate image-capturing, with a second depth image and a second 2D image, which correspond to the first 2D image and a first depth image, respectively, and outputting the images together.

After step S300, the reference 2D image and the corresponding depth image or the reference depth image and the corresponding 2D image are output as output data for motion analysis at step S400. Here, at step S400, the amount of output data for motion analysis may be adjusted according to the motion speed of the user. This will be described in detail later with reference to FIGS. 10 to 12.

Thereafter, through the analysis of the output data at step S400, information about the skeleton (skeletal information) of the user is extracted at step S500. Here, the skeletal information may include skeleton joint information and skull information. The skeleton joint information may include information about the neck, left/right shoulders, left/right elbows, left/right wrists, left/right sides of the pelvis, left/right knees, and left/right ankles. Further, the skeletal information may be extracted using a Randomized Decision Forest (RDF) technique. A background area and a user area are set from pixel data based on depth information values. The probability distribution of skeleton joints, in which pixels in the set user area will correspond to skeleton joints in the body of the user, is derived based on only pixel data, the data range of which is reduced to the set user area. Skeleton joints having a high probability distribution value are classified as a pixel area, and then pixels corresponding to a specific position in the user's body may be estimated.

At step S500, the skeletal information of the user may be extracted to include information about the head of the user, and the value corresponding to the distance between the user's feet may be calculated based on the position values of the ankle joints of the user through the analysis of the output data. Further, at step S500, the coordinates of the center of gravity of the user and the coordinates of the joint of the right or left foot may be calculated, the value corresponding to the angle of an arm may be calculated based on the coordinates of the joints of the shoulders, elbows, and hands, and the value of a reverse spine angle may be calculated based on the coordinates of the head and the left/right sides of the pelvis. Furthermore, at step S500, the angle between a line connecting the head and the pelvis and a line connecting the two shoulders may be calculated based on the coordinates of the head, the left/right sides of the pelvis, and the left/right shoulders, and a 3D point cloud may be calculated based on the pixel data of the output data.

Also, the motion of the user is displayed on the display unit based on the skeletal information at step S600. At step S600, the motion of the user, differing from a preset reference motion by a predetermined level or more, among the motions of the user, may be displayed on the display unit. Further, at step S600, the movement of the head ranging from an address section to an impact section in the golf motion of the user may be displayed, and the distance between the feet in the golf motion of the user may be displayed. Furthermore, at step S600, the center of gravity of the user and the position of the joint of the right or left foot may be displayed during a backswing section or a downswing section in the golf motion of the user, a line connecting the joints of the shoulders, elbows, and hands during the impact section in the golf motion of the user may be displayed, and a line connecting the left or right foot and the center of the left/right sides of the pelvis during the backswing section in the golf motion of the user may be displayed. Furthermore, at step S600, a line connecting the head and the pelvis and a line connecting the two shoulders during a backswing top section in the golf motion of the user may be displayed, and the skeletal information may be displayed as a 3D point cloud on the display unit.

The golf motion analysis method according to another embodiment of the present invention may perform steps which include steps S100, S200, S500, and S600 of FIG. 1. That is, the golf motion analysis method according to another embodiment of the present invention may include the step of acquiring, by the image sensor of the camera unit, a 2D image of the golf motion of the user, the step of acquiring, by the depth sensor of the camera unit, a depth image which includes depth values of respective pixels in the 2D image, the step of extracting skeletal information of the user through the analysis based on the 2D image and the depth image, and the step of displaying the positions of the joints of the user on the display unit based on both the 2D image and the skeletal information.

Below, the method for increasing image-capturing speed based on step S300 of FIG. 1 will be described in detail.

Figure 3:
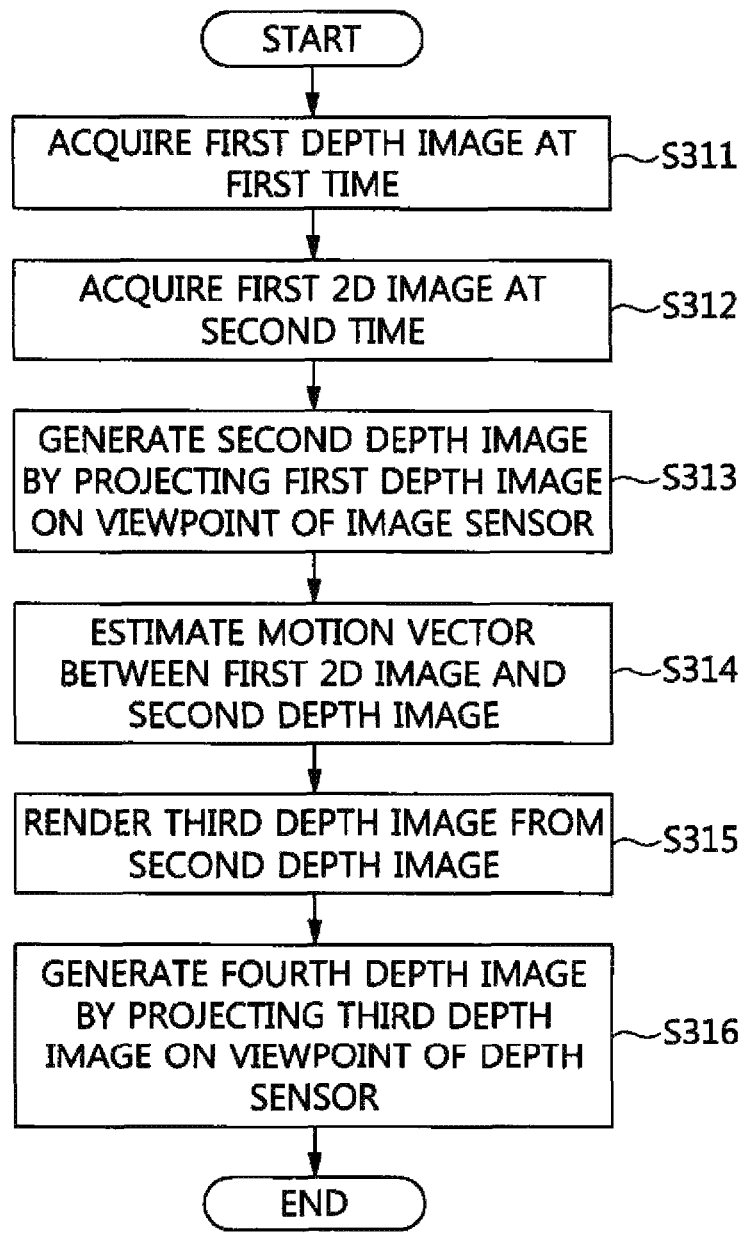
FIG. 3 illustrates an example of a flowchart additionally showing an image-capturing speed increasing step in the golf motion analysis method according to an embodiment of the present invention.

FIG. 3 illustrates an example of a flowchart additionally showing an image-capturing speed increasing step in the golf motion analysis method according to an embodiment of the present invention.

Referring to FIG. 3, in an example of step S300, the depth sensor first acquires a first depth image at a first time at step S311, and the image sensor acquires a first 2D image as a reference 2D image at a second time, after the first time, at step S312. The first depth image and the first 2D image, which are acquired at steps S311 and S312, may be the depth image and the 2D image acquired at steps S100 and S200.

After step S312, the first depth image is projected on the viewpoint of the image sensor, and then a second depth image at the first time is generated at step S313.

Then, a motion vector between the first 2D image and the second depth image is estimated at step S314.

Thereafter, a third depth image, projected at the second time, is rendered from the second depth image using the motion vector at step S315.

Further, the third depth image is projected on the viewpoint of the depth sensor, and then a fourth depth image at the second time is generated as the corresponding depth image at step S316. At step S400 of FIG. 1, the first 2D image and the fourth depth image may be output as output data.

Figure 4:
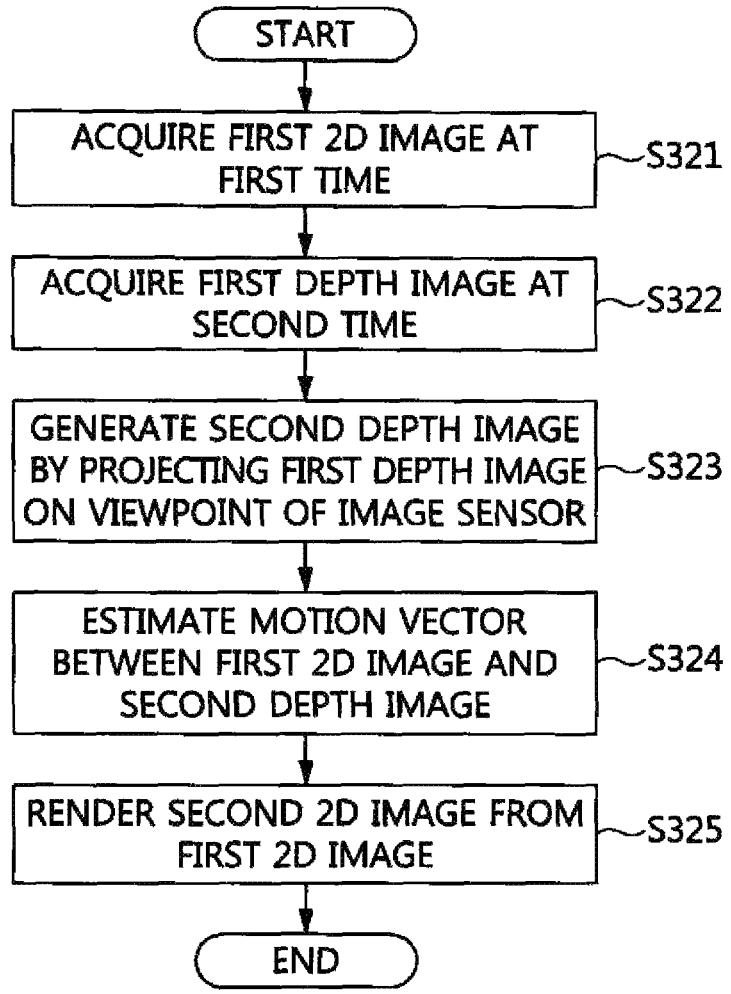
FIG. 4 illustrates another example of a flowchart additionally showing an image-capturing speed increasing step in the golf motion analysis method according to an embodiment of the present invention.

FIG. 4 illustrates another example of a flowchart additionally showing an image-capturing speed increasing step in the golf motion analysis method according to an embodiment of the present invention.

Referring to FIG. 4, in another example of step S300, the image sensor first acquires a first 2D image at a first time at step S321, and the depth sensor acquires a first depth image as a reference depth image at a second time, after the first time, at step S322. The first 2D image and the first depth image, which are acquired at steps S321 and S322, may be the depth image and the 2D image, which are acquired at steps S100 and S200.

After step S322, the first depth image is projected on the viewpoint of the image sensor, and then a second depth image is generated at step S323.

Further, a motion vector between the first 2D image and the second depth image is estimated at step S324.

Thereafter, the second 2D image at the second time is rendered as the corresponding 2D image from the first 2D image using the motion vector at step S325. At step S400 of FIG. 1, the first depth image and the second 2D image may be output as the output data.

Steps S313 and S323 may be the method for calculating 3D coordinates corresponding to the respective pixels of the depth image using the intrinsic parameters of the depth sensor. In this case, the 3D coordinates are projected on the image plane of the image sensor using extrinsic parameters between the image sensor and the depth sensor.

At steps S314 and S324, motion information between the first 2D image and the projected second depth image may be estimated. In an embodiment, a motion vector may be calculated by matching respective pixels in a first RGB image with pixels in the search area of the depth image. Since the modalities of the two images are different from each other, the corresponding relationship between the two images may be detected using mutual information between two patches which are targets to be matched.

$$I(X;Y) \triangleq D_{KL}(p(x,y) \| p(x)p(y)) = \sum_{y \in Y} \sum_{x \in X} p(x,y) \log\left(\frac{p(x,y)}{p(x)p(y)}\right)$$

At steps S315 and S325, an image at time t may be generated through rendering using the image and motion information at time t−1.

$$I_t(x) = I_{t-1}(x + m(x))$$

Here, x denotes pixel coordinates and m(x) denotes the motion vector of pixel x.

Below, the skeletal information extraction step S500 of FIG. 1 will be described in detail.

Figure 5:
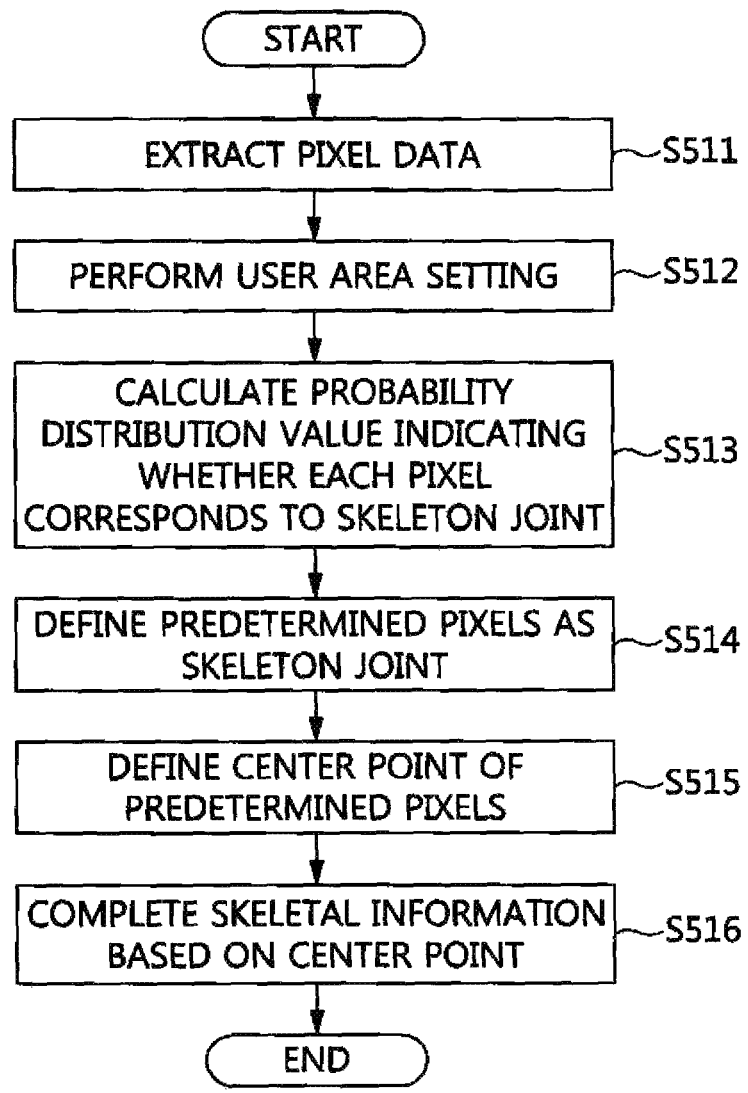
FIG. 5 is a flowchart showing in detail a skeletal information extraction step in the golf motion analysis method according to an embodiment of the present invention.

FIG. 5 is a flowchart showing in greater detail the skeletal information extraction step in the golf motion analysis method according to an embodiment of the present invention.

Referring to FIG. 5, pixel data is extracted from the output data acquired at step S400 of FIG. 1 at step S511. Here, the pixel data may be at least one of the depth information, RGB value, and illuminance value of each pixel.

Figure 6:
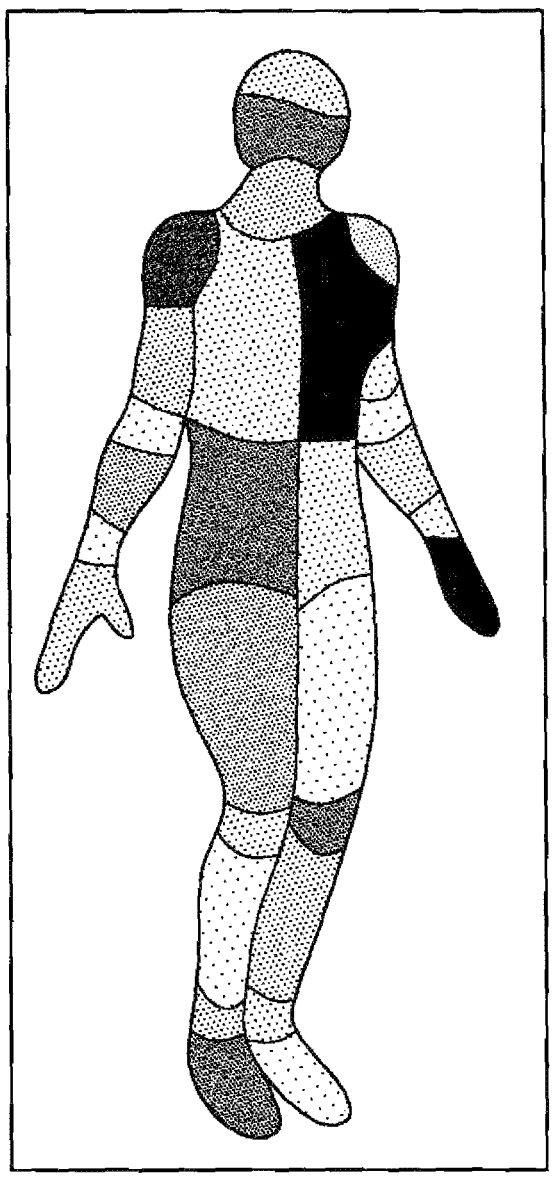
FIGS. 6 and 7 are diagrams showing the user area setting step of the skeletal information extraction step.
Figure 7:
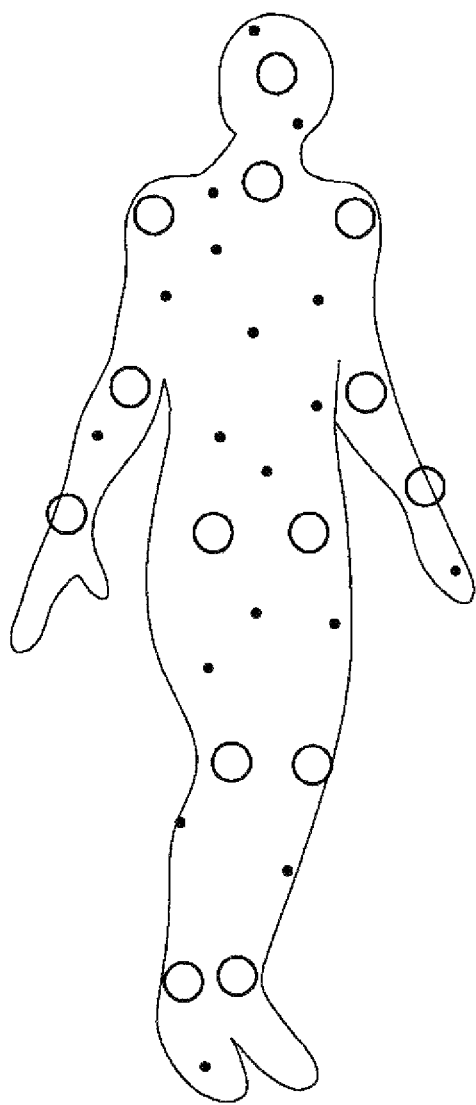

Further, pixels in an area corresponding to the user are selected based on the pixel data at step S512. Step S512 is a user area setting step. Referring to FIGS. 6 and 7, examples of elements included in the user area are illustrated. Step S512 may be implemented using various methods. For example, the distribution between the maximum value and the minimum value of distance values between individual pixels is acquired, and a group of values in a learned specific distribution may be estimated as the user area.

Figure 8:
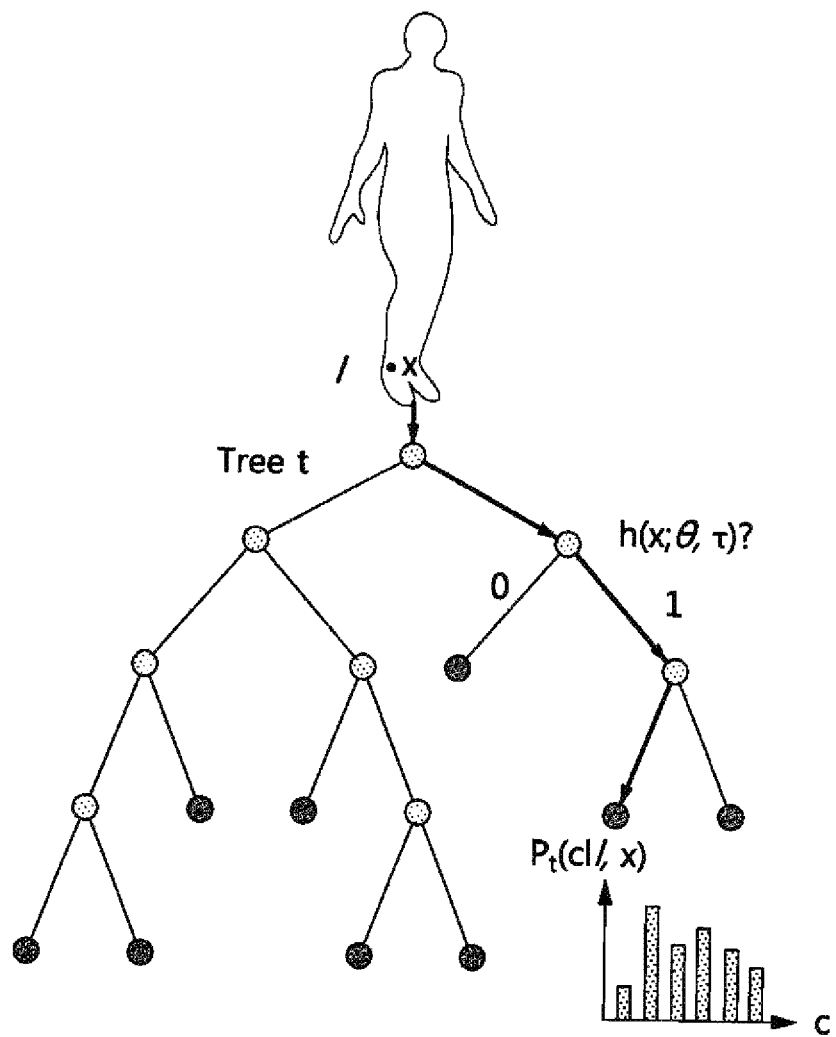
FIG. 8 is a diagram showing a probability distribution calculation method at the skeletal information extraction step.

After step S512, a probability distribution value indicating whether each of the pixels included in the user area corresponds to a skeleton joint is calculated at step S513. The method for acquiring the probability distribution value at step S513 may be performed based on a Randomized Decision Forest (hereinafter referred to as 'RDF') technique. The probability distribution value based on the RDF is obtained by traversing one or more decision trees and summing probability distribution values stored in leaf nodes. Such a decision tree includes a root node and child nodes, which are classified into several stages, as in the case of first child nodes primarily classified from the root node, and second child nodes classified from each first child node, in the form of a tree structure. The child nodes located at the lowest level of the tree are defined as leaf nodes. The split of an upper node into lower nodes depends on node split variables, which include feature variables based on information about one or more pixels and predefined threshold variables. FIG. 8 is a diagram illustrating a probability distribution calculation method, and shows a procedure for obtaining probability distribution using a decision tree when an input depth image and test pixels are given.

Assuming that depth image I and pixel x are given in a decision tree, the tree is traversed by repeatedly applying the following weak classification rule to respective nodes until the current node reaches the leaf nodes after starting from the root node.

$$h(x;\theta,\tau)=[f(x;\theta)\geq\tau]$$

As the feature, the following simple depth comparison feature is used:

$$f(x;\theta) = I\left(x + \frac{u}{I(x)}\right) - I\left(x + \frac{v}{I(x)}\right)$$

where θ=(u, v) denotes a feature parameter composed of two offset vectors. A discrete probability distribution Pt(c|I, x) of joint classes is obtained from the leaf nodes of tree t. Those distributions for all trees in the Random Forest are combined, and the following final distribution is calculated.

$$P(c \mid I, x) = \frac{1}{T}\sum_{t=1}^{T} Pt(c \mid I, x)$$

The algorithm for learning the Random Forest is as follows. New learning image data is configured by uniformly sampling existing learning image data with replacement for each tree. Using this new learning data, a tree is expanded by recursively applying the following procedure to the tree until specific stopping criteria are satisfied:

a. A set of node split variables ϕ=(θ, τ) composed of a feature variable θ and a threshold variable τ is randomly generated.

b. For each split variable ϕ, learning data Q={(I, x)} is split into the following left and right sets:

$$Q_L(\phi)=\{(I,x)|h(x;\phi)=0\}$$

$$Q_R(\phi)=\{(I,x)|h(x;\phi)=1\}$$

c. For the left/right sets corresponding to the split variables, the following information gain is calculated.

$$G(\phi) = H(Q) - \frac{|Q_L(\phi)|}{|Q|}H(Q_L(\phi)) = \frac{|Q_R(\phi)|}{|Q|}H(Q_R(\phi))$$

Here, H(Q) denotes the Shannon entropy of a normalized histogram PQ of the set Q.

d. A node split variable having the maximum information gain is selected, and is allocated to the current node.

$$\phi^* = \underset{\phi}{\mathrm{argmax}} G(\phi)$$

e. When the maximum information gain is less than a predefined threshold or when the depth of the current node in the tree reaches a maximum value, the algorithm is stopped, and the tree is returned. Otherwise, the above steps a to d are recursively applied to left and right nodes.

Based on the probability distribution value calculated at step S513, predetermined pixels are defined as a skeleton joint at step S514.

Further, the center point of the predetermined pixels, defined as the skeleton joint, is defined at step S515.

Figure 9:
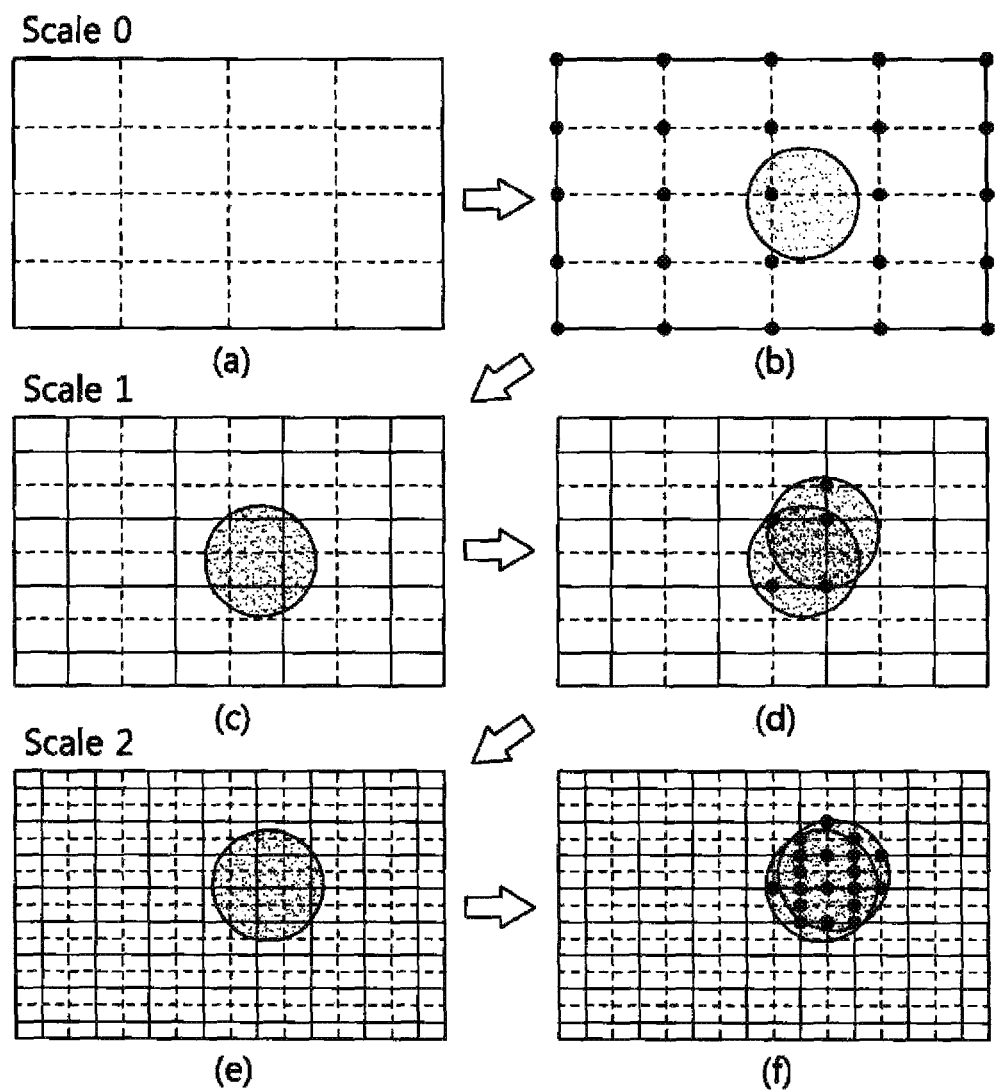
FIG. 9 is a diagram showing a multi-scale technique for reducing the computational load at the skeletal information extraction step.

Steps S514 and S515 are configured to define the skeleton joint and the center point thereof by performing the step of decreasing the resolution of the pixel data, the step of defining the skeleton joint and the center point thereof based on the low resolution, the step of increasing the resolution of the pixel data, the step of setting an area ranging a predetermined distance from the center point derived based on the low resolution, and the step of newly defining a skeleton joint and the center point thereof based on the pixels within the area FIG. 9 is a diagram showing a multi-scale technique for reducing the computational load of the skeletal information extraction step, and illustrates the step of defining the skeleton joint and the center point thereof via the adjustment of resolution. This technique is a method for finding the center point using an RDF method based on a small number of pixels at low resolution, and a center point is newly found using the RDF method with high resolution only in a predetermined area ranging from the found center point, thus improving efficiency by reducing the number of pixels used, without changing the reliability of analysis.

Meanwhile, as the method of preventing n-th child nodes whose probability distribution values do not exceed preset values from being further classified so as to improve the computational efficiency of the RDF, the control unit may use a method for deriving leaf nodes only from nodes having high probability values, rather than obtaining leaf node values from all decision trees.

More specifically, the function of Random Forest in the skeleton extraction algorithm is to calculate the probability value corresponding to a specific skeleton joint for each pixel of an input image. This value is obtained by summing probability values stored in leaf nodes after traversing individual decision trees. The probability values mean the contribution of individual 3D points to the probability density function of each joint. The basic idea of the cascade technique is to ignore points whose contribution is low. Since there is no need to completely traverse the decision trees for such points whose contribution is low, Random Forest computation may be terminated before reaching the leaf nodes. However, in order to implement this idea, the auxiliary probability vector $P_t^n$ for each node n of the decision tree t is recursively defined as follows:

$$P_t^n = \begin{cases} P_t & \text{if } n \text{ is a leaf node} \\ \max(P_t^l, P_t^r) & \text{otherwise} \end{cases}$$

where $P_t$ denotes a probability distribution stored in the leaf node of the original Random Forest classifier, and $P_t^l$ and $P_t^r$ denote the auxiliary probability vectors of two child nodes of node n, respectively. Assuming that node n is reached during a Random Forest computation procedure for input depth I and pixel x, and $P_t^n(c)=\rho$ is satisfied, it means that the probability $Pt(c|I, x)$ of the joint class c does not exceed $\rho$, regardless of which path has been selected in the current node n. Therefore, when $\rho$ is less than a predefined low threshold $\rho_{node}$, the cascade algorithm returns a probability value of 0 without further traversing the trees, so as to reduce the computational load.

Meanwhile, the control unit additionally defines a rejection tree for classifying skeleton joint classes into joint classes and non-joint classes depending on whether all of the skeleton joint classes are combined into a single joint class. In this case, a method for using the rejection tree as the introduction tree of a Random Decision Tree (RDT) and executing the RDT when the output probability based on the rejection tree is greater than a preset value may be used.

More specifically, this serves to extend the above-described cascade idea to the tree level. The basic idea is to define a new classifier for rapidly checking the termination and locate the new classifier prior to the Random Forest classifier. To reduce the additional computational load attributable to the new classifier, the classifier must have a simple structure and must enable fast testing. For this, a randomized decision tree for classifying input pixels as joint classes or non-joint classes is defined as a rejection tree. Such a binary decision tree may be learned by combining all skeleton joint classes in the learning data introduced for Random Forest in the above description into a single joint class and utilizing the single joint class. The output probability of the rejection tree is assumed to be $P_0(c|I, x)$. The developed tree cascade technique performs a Random Forest computation only when $P_0(c|I, x)$ is greater than a low threshold $\rho_{tree}$. For multiple pixels located far away from the skeleton joint point, this probability value has such a small value that the pixels in additional Random Forest computation are ignored.

Thereafter, based on the center point, the skeletal information is completed and extracted at step S516.

Hereinafter, mode change performed when output data is output depending on the motion speed of the user in the golf motion analysis method according to the embodiment will be described in detail.

Figure 10:
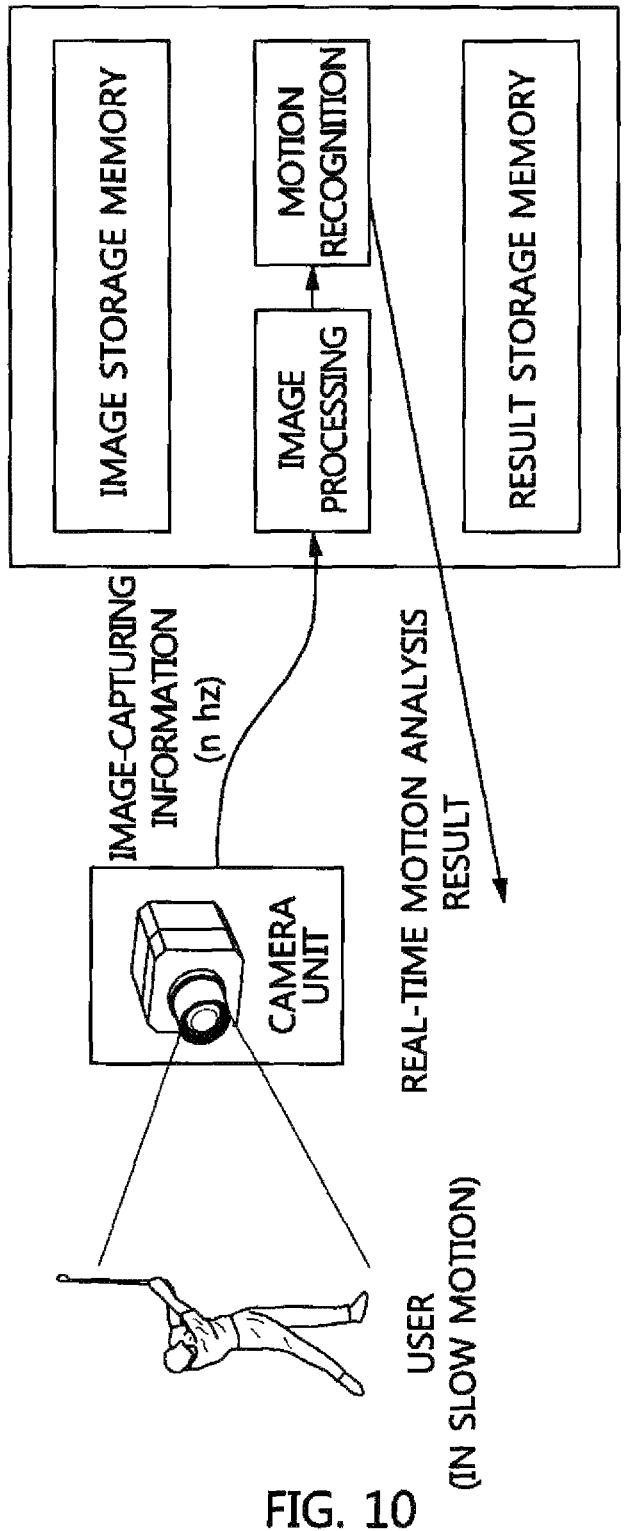
FIGS. 10 to 12 are diagrams showing the mode change of the present invention depending on the motion speed of a user.
Figure 11:
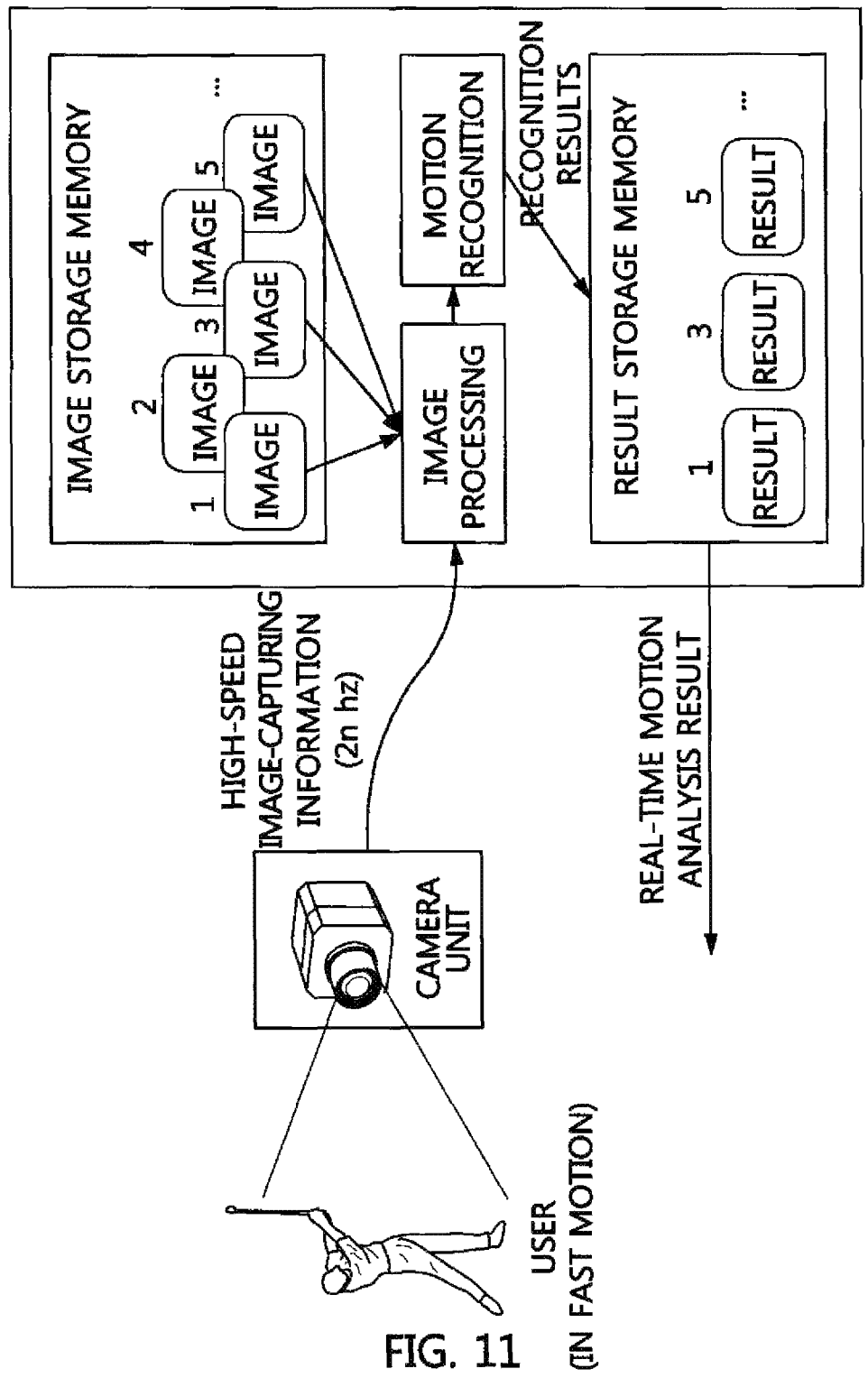
Figure 12:
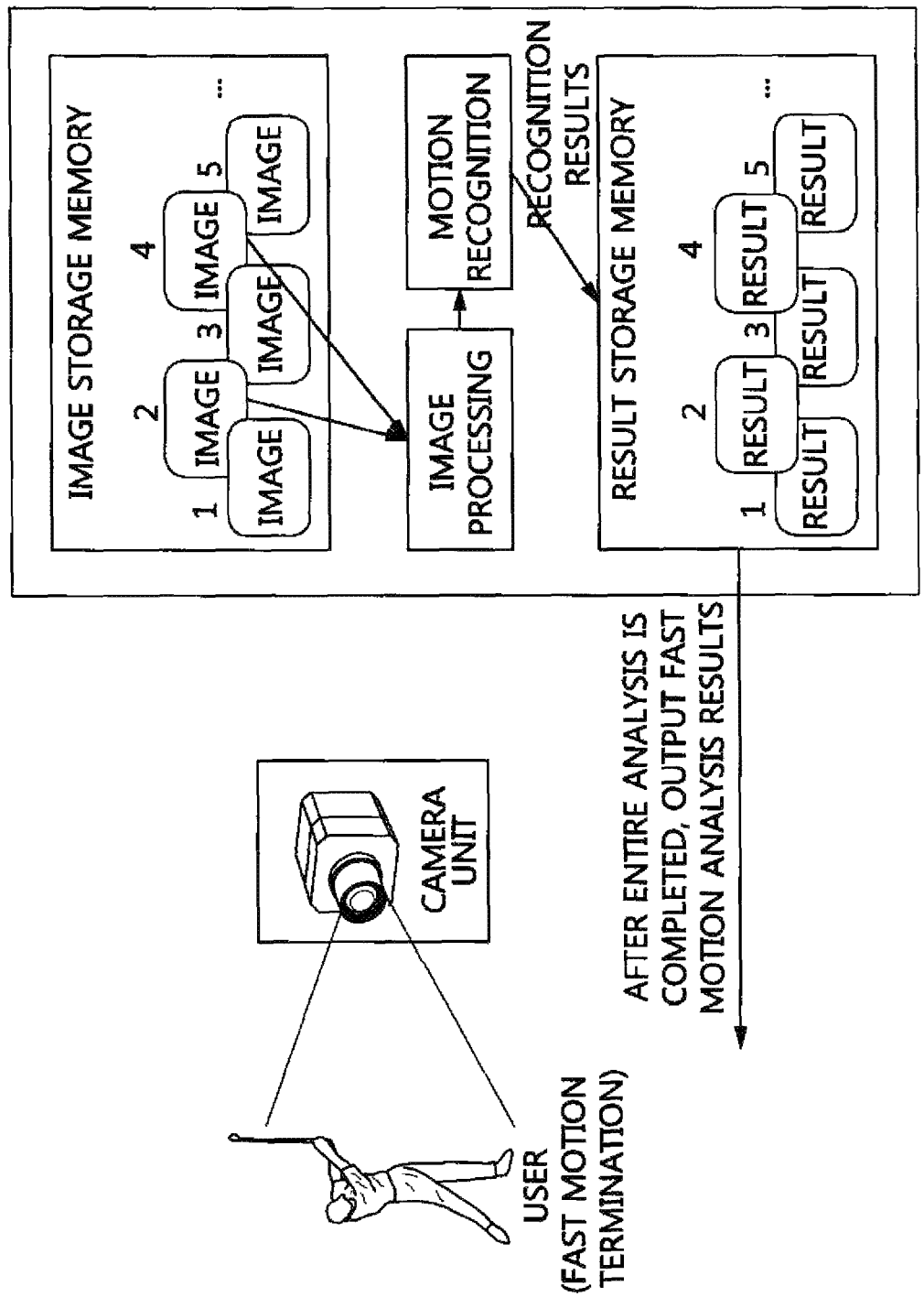

FIGS. 10 to 12 are diagrams showing the mode change of the present invention depending on the motion speed of the user.

Referring to FIG. 10, when the motion speed of the user is less than a preset value, all of a reference 2D image and a corresponding depth image or a reference depth image and a corresponding 2D image may be output, in real time, as output data for motion analysis. This shows that images of the user may be captured at n Hz in a real-time motion recognition mode via the camera unit, and that the captured information may be analyzed in real time via the control unit. Therefore, image storage memory or result storage memory is not used. The advantage of this mode is to check the motion of the user in real time. The control unit of the present invention may analyze the motion of the user in the real-time motion recognition mode, and may check in real time whether the user is ready to make a fast motion. In a more detailed example, before a golf swing, which is one such fast motion, is performed, the user assumes an address posture for gripping the club with the two hands together. When the control unit analyzes the address posture in real time and recognizes that the user has assumed the address posture, the control unit may predict that a fast motion will be subsequently performed.

Referring to FIG. 11, when the motion speed of the user is equal to or greater than a preset value, some of the reference 2D image and the corresponding depth image or the reference depth image and the corresponding 2D image may be extracted and output as output data for motion analysis. In order for the images captured in the fast motion recognition mode to be operated in real time, results must be output by applying both image processing and motion recognition within the time corresponding to a high speed capturing period. However, this is difficult in reality, and thus images captured at high speed are stored, and some of the images are used for the analysis of real-time motion recognition results in this mode. For example, when the user assumes a fast motion, the camera unit captures images at a speed (2n Hz) higher than that of a real-time mode, and stores the images in the image storage memory. From the image storage memory, only odd-numbered images are extracted, and thus the control unit may perform image processing and motion recognition on the extracted images. The results of motion recognition may be stored in the result storage memory at the same time that they are displayed on the display unit in real time. The difference from the first mode is that high-speed images are stored in the image storage memory for subsequent analysis, and the results of analyzing some of the stored high-speed images are stored in the result storage memory while being output. The fast motion recognition mode is primarily advantageous in that whether the user terminates a fast motion is checked, and if the fast motion has been terminated, the fast motion recognition mode is terminated, thus allowing the camera unit to efficiently capture only the required part at high speed, and is secondarily advantageous in that only fast motion parts are stored in the image storage memory and the result storage memory, thus enabling the memory to be efficiently managed.

Referring to FIG. 12, when the motion speed of the user is equal to or greater than a preset value, and then some of the reference 2D image and the corresponding depth image or the reference depth image and the corresponding 2D image is extracted and output as output data for motion analysis, the remaining data may be stored, and may be output as output data for motion analysis if the motion speed of the user is changed to a value less than the preset value.

This means that the entire fast motion captured by the camera unit may be analyzed in a remaining fast motion analysis mode, the results of analyzing the entire fast motion may be stored in the result storage memory, and the analyzed results may be output. The display unit analyzes remaining fast motions in the remaining fast motion analysis mode after a finish posture, indicating that the golf swing of the user has finished, is assumed, while playing and providing the user's swing in slow motion. Further, the display unit may play an exemplary golf swing in slow motion, and may also display golf tips. By means of this display, the required waiting time until the remaining fast motions are analyzed is perceived by a user to be reduced.

Hereinafter, the step of displaying the user's motion on the display unit based on skeletal information in the golf motion analysis method according to the embodiment of the present invention will be described in detail.

Figure 13:
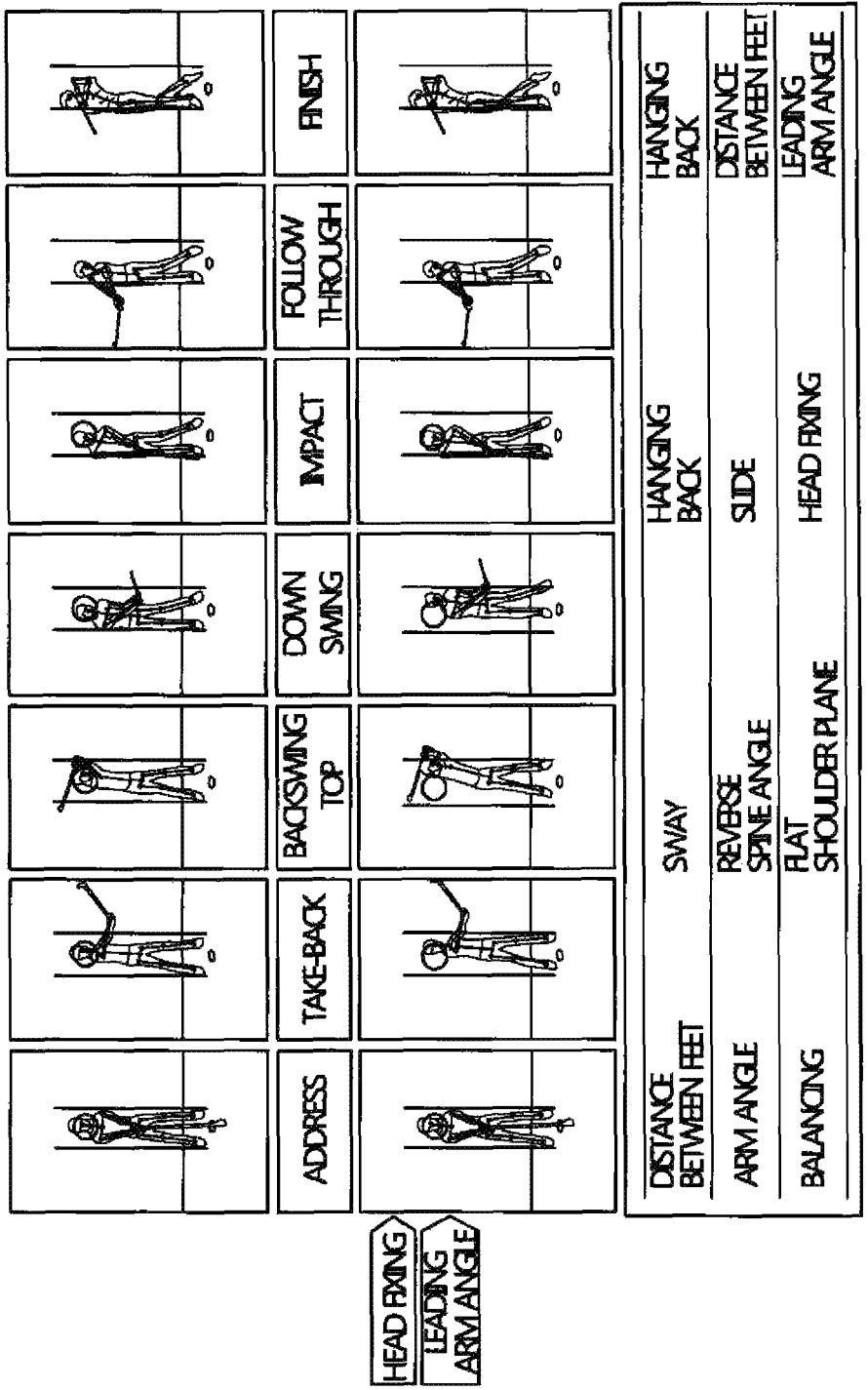
FIG. 13 is a diagram illustrating display on a display unit in the golf motion analysis method according to an embodiment of the present invention.

FIG. 13 is a diagram illustrating display on the display unit in the golf motion analysis method according to an embodiment of the present invention.

Referring to FIG. 13, skeletal information may be displayed in 2D images acquired by capturing images of the motion of the user for respective steps of the golf motion of the user (address, take-back, backswing top, downswing, impact, follow through, and finish) on the display unit. Further, in the respective motions, variation in the head position, that is, whether the head is fixed, and the angle of the leading arm may be displayed. Furthermore, in golf motion, principal points (e.g. distance between feet, head fixing, and balancing) and points to be noted (e.g. sway, hanging back, reverse spine angle, and slide), that is, analysis results for correcting golf motion, may be displayed on the display unit. For example, the control unit may extract skeleton joint information and skull information. The display unit may display the positions of the skeleton joints as points in a 2D image. Also, the display unit may display the position of the skull as a circle.

Furthermore, according to an embodiment, a line connecting two or more skeleton joints, or the skeleton joints with the skull, may be displayed in the 2D image. For example, the display unit may display lines or figures connecting points at joints of the two shoulders, joints of the two arms, and wrist joints in the 2D image. When the control unit classifies a golf motion into respective sections, the display unit may display lines or figures connecting points at the joints of both shoulders, both arms, and both wrists in the 2D image acquired in an address section or an impact section. Such a line or figure functions as a guide line that causes the angle between the two shoulders and the two arms to form an inverted triangle having a predetermined shape in the address section and the impact section.

The position or shape of the line or the figure connecting the points at the skeleton joints may be compared with a reference preset by the control unit. Based on the result of the comparison, the display unit may differently display the colors or representation schemes of the line or the figure.

For example, the control unit may calculate the angle formed by the shoulders, elbows, and wrists on the basis of the elbows. At this time when the calculated angle falls within a reference range, the line connecting the corresponding skeleton joints may be indicated in a green color. Otherwise, the control unit may indicate the corresponding line in a yellow or red color depending on the extent of deviation from the reference range.

Figure 14:
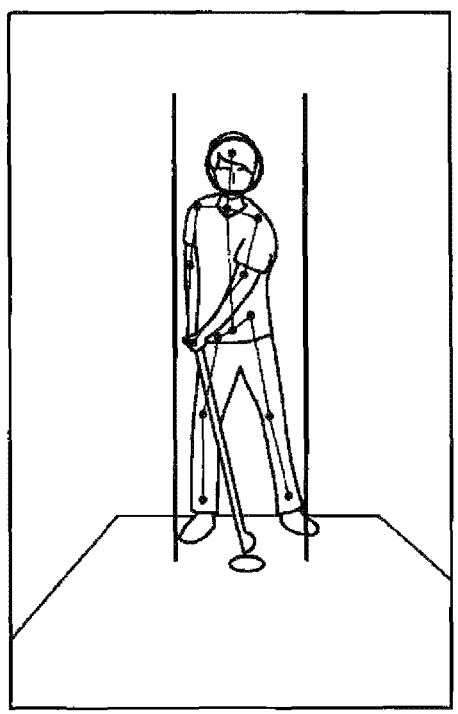
FIGS. 14 to 16 illustrate display on the display unit in respective cases where analyzed user motion matches a reference motion and does not match the reference motion.
Figure 15:
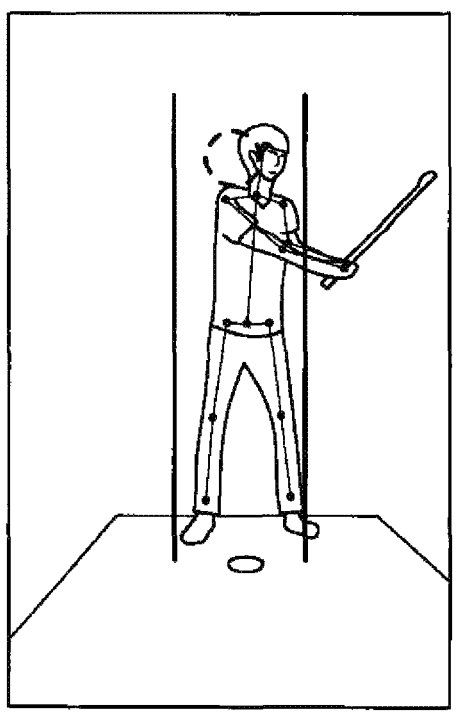
Figure 16:
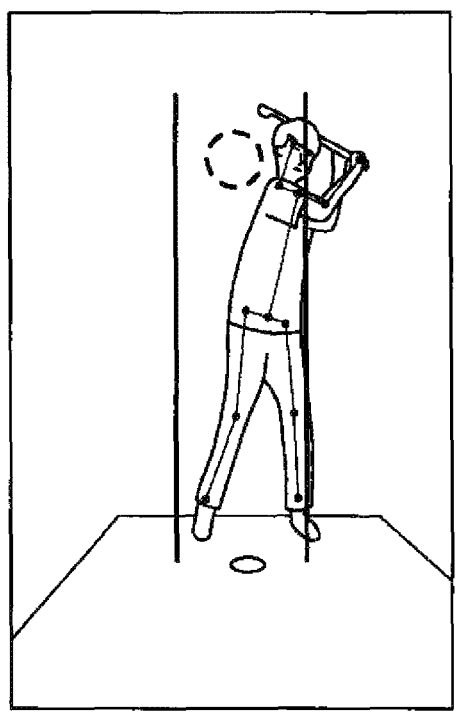

Even for a circle displaying the position of the skull, when the position of the circle falls within a reference range, the circle displaying the skull is indicated in a green color, otherwise the corresponding line may be indicated in a yellow or red color depending on the extent of deviation from the reference range. FIGS. 14 to 16 illustrate display on the display unit in respective cases where the analyzed user motion matches a reference motion and does not match the reference motion. In FIG. 14, since the position of the user's head falls within a normal range, it is represented by a solid circle. In FIGS. 15 and 16, since the position of the user's head falls out of the normal range, it is represented by a dotted circle. When the control unit classifies golf motion into respective sections, the display unit may display variation in the position (movement distance) of the skeleton joints and the skull between respective sections. For example, the display unit may display variation in the position of the skull from an address section to an impact section. Meanwhile, since the control unit may extract the 3D position information from the skeletal information, such position variation may be 3D position variation.

Figure 17:
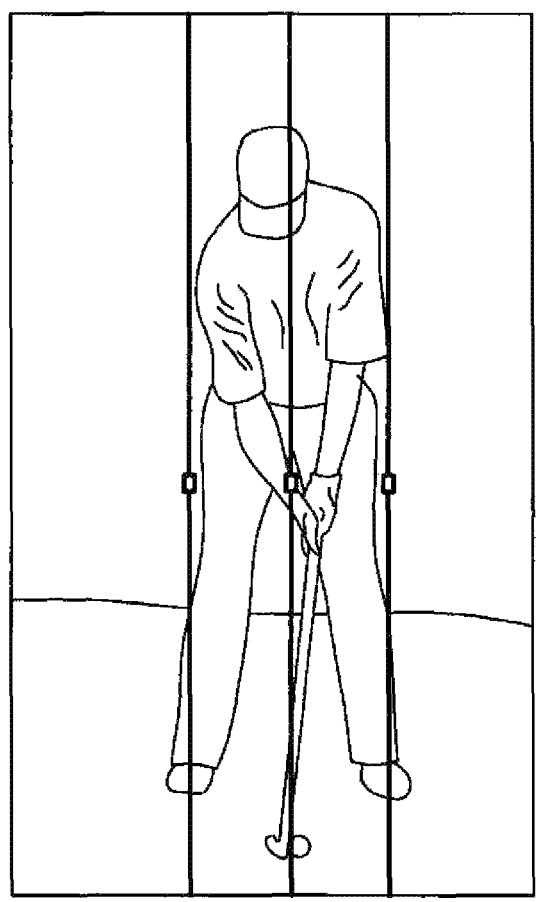
FIG. 17 illustrates an example in which the distance between feet is displayed at a display step.
Figure 18:
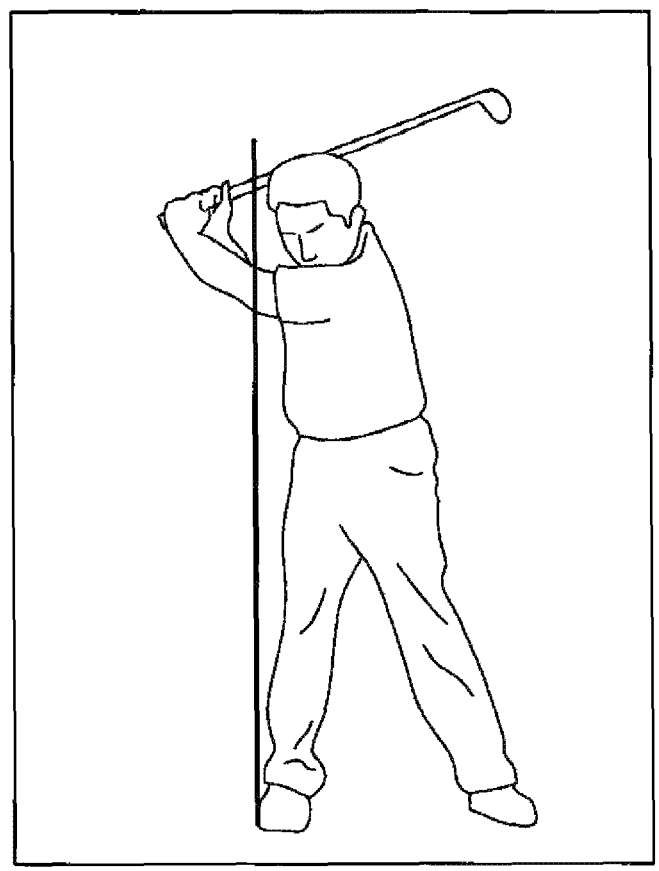
FIGS. 18 and 19 illustrate an example of the identification of sway through the analysis of the user's motion.
Figure 19:
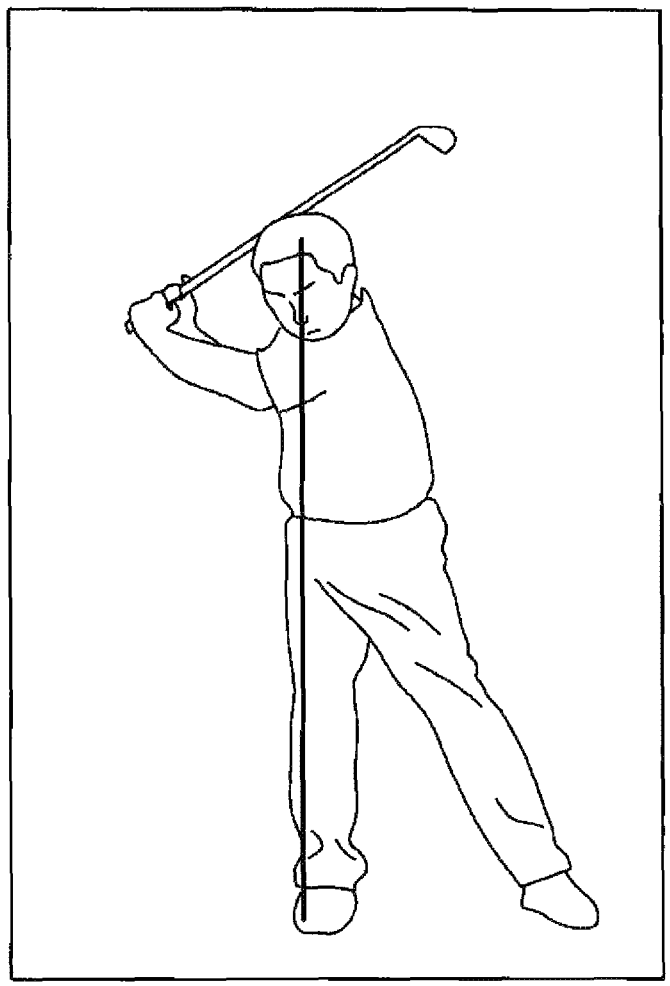

FIG. 17 illustrates an example of display of the distance between the feet at the display step. In the golf motion, the distance (interval) between the feet must essentially be maintained at about shoulder width, and thus this distance is represented, wherein calculation is performed based on the following variables and discriminant 3D coordinates of joints of both feet: $X_1$, $X_2$
3D coordinates of joints of both shoulders: $Y_1$, $Y_2$
Discriminant: $\|\|X_1-X_2\|-\|Y_1-Y_2\|\|<\theta$ FIGS. 18 and 19 illustrate an example of the identification of sway through the analysis of the user's motion. "Sway" means that, during the backswing, the lower part of a body excessively moves away from a target point and the center of gravity of the body moves outwards from the rear portion of the foot. FIG. 18 illustrates a correct posture and FIG. 19 illustrates sway, wherein calculation is performed based on the following variables and discriminant:

Point cloud $\{P_i\}_{i=1}^{N}$
3D coordinates of center of gravity:

$$C = \frac{1}{N} \cdot \sum_{i=1}^{N} P_i$$

3D coordinates of joint of right foot: R
Discriminant: $C_X-R_X<\theta$

Figure 20:
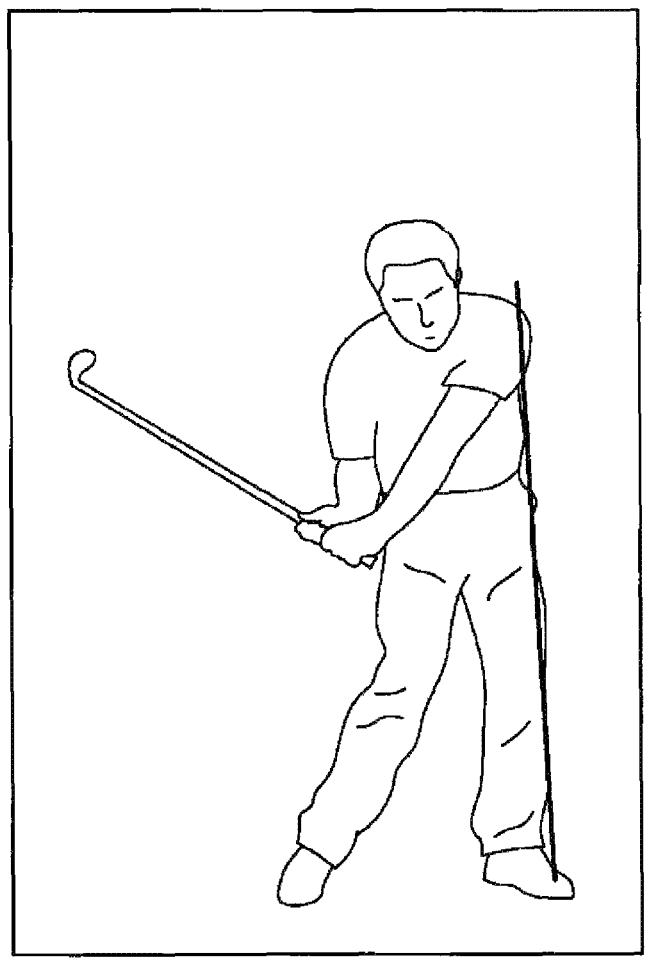
FIGS. 20 and 21 illustrate an example of the identification of hanging back through the analysis of the user's motion.
Figure 21:

FIGS. 20 and 21 illustrate an example of the identification of hanging back through the analysis of the user's motion. "Hanging back" means a lack of weight transference onto the lead leg during the downswing. FIG. 20 illustrates a correct posture and FIG. 21 illustrates hanging back, wherein calculation is performed based on the following variables and discriminant:

Point cloud $\{P_i\}_{i=1}^{N}$
3D coordinates of center of gravity:

$$C = \frac{1}{N} \cdot \sum_{i=1}^{N} P_i$$

3D coordinates of joint of left foot: L
Discriminant: $C_X-L_X<\theta$

Figure 22:
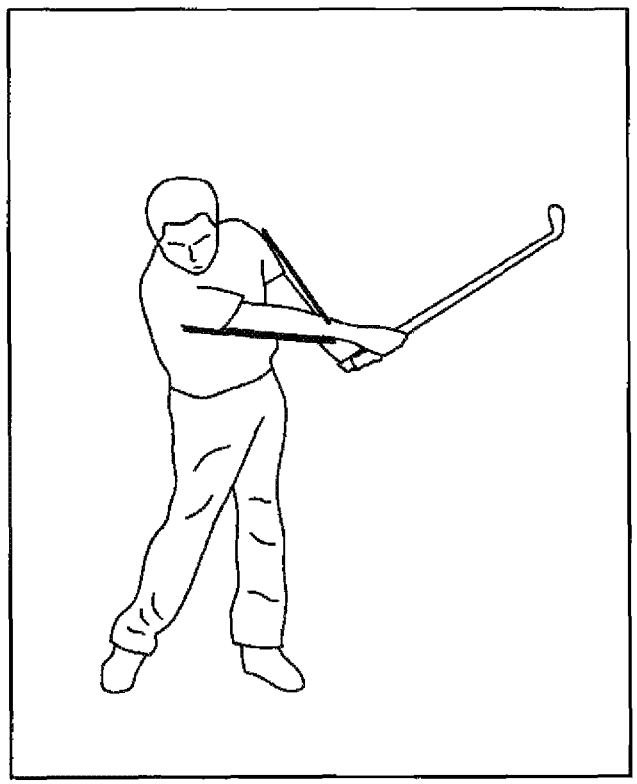
FIGS. 22 and 23 illustrate an example of the identification of chicken wing through the analysis of the user's motion.
Figure 23:
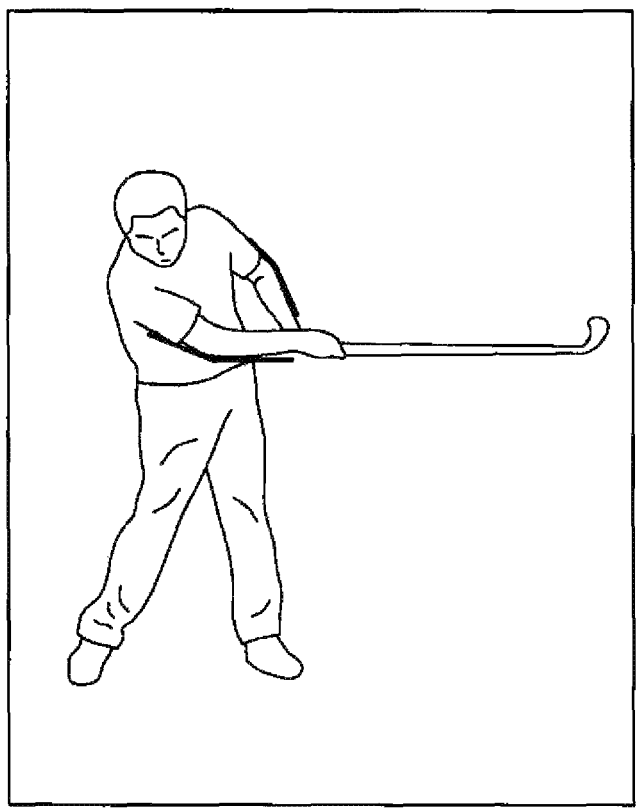

FIGS. 22 and 23 illustrate an example for the identification of chicken wing through the analysis of the user's motion. "Chicken wing" means a problem folding a lead elbow during an impact posture. FIG. 22 illustrates a correct posture and FIG. 23 illustrates chicken wing, wherein calculation is performed based on the following variables and discriminant:

3D coordinates of left shoulder: S
3D coordinates of left elbow: E
3D coordinates of left hand: H
Angle between shoulder-elbow line and elbow-hand line:

$$\varphi = \cos^{-1} \frac{(S-E) \cdot (E-H)}{\|S-E\| \|E-H\|}$$

Discriminant: $\varphi > \theta$

This procedure is repeated on the right part.

Figure 24:
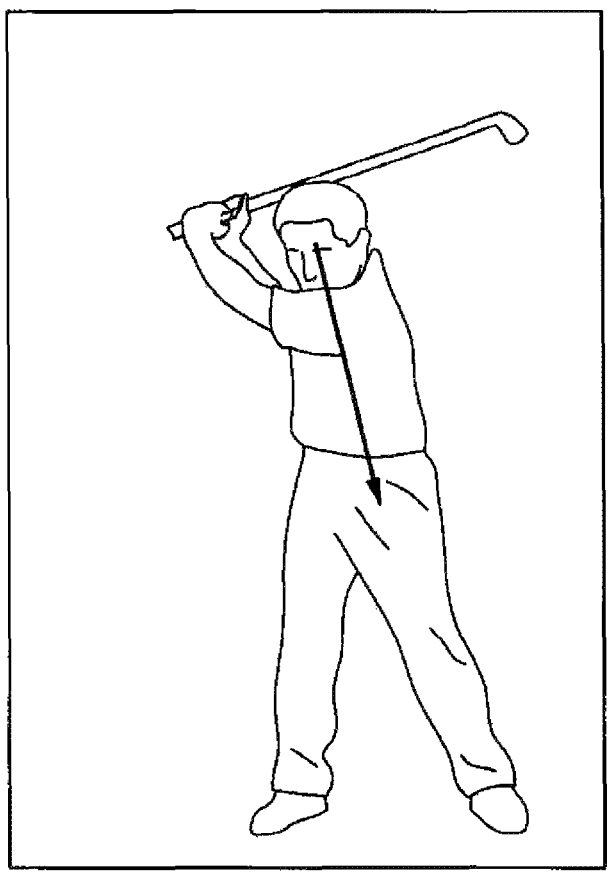
FIGS. 24 and 25 illustrate an example of the identification of a reverse spine angle through the analysis of the user's motion.
Figure 25:
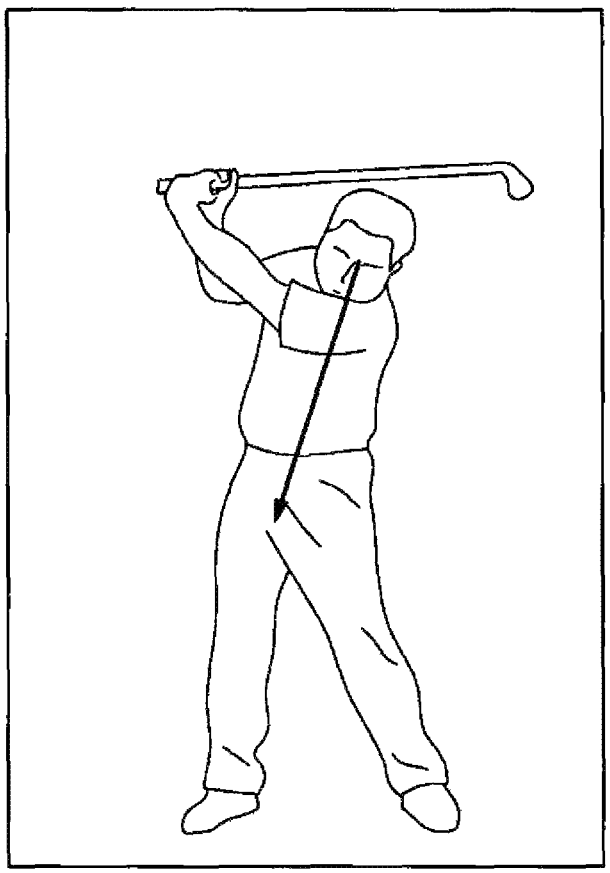

FIGS. 24 and 25 illustrate an example of the identification of a reverse spine angle through the analysis of the user's motion. "Reverse spine angle" means excessive backward bending of the upper body during the backswing. FIG. 24 illustrates a correct posture and FIG. 25 illustrates a reverse spine angle, wherein calculation is performed based on the following variables and discriminant:

3D coordinates of head: H
3D coordinates of left side of pelvis: L
3D coordinates of right side of pelvis: R
3D coordinates of center of pelvis:

$$C = \frac{1}{2}(L+R)$$

Discriminant: $H_X - C_X > \theta$

Figure 26:
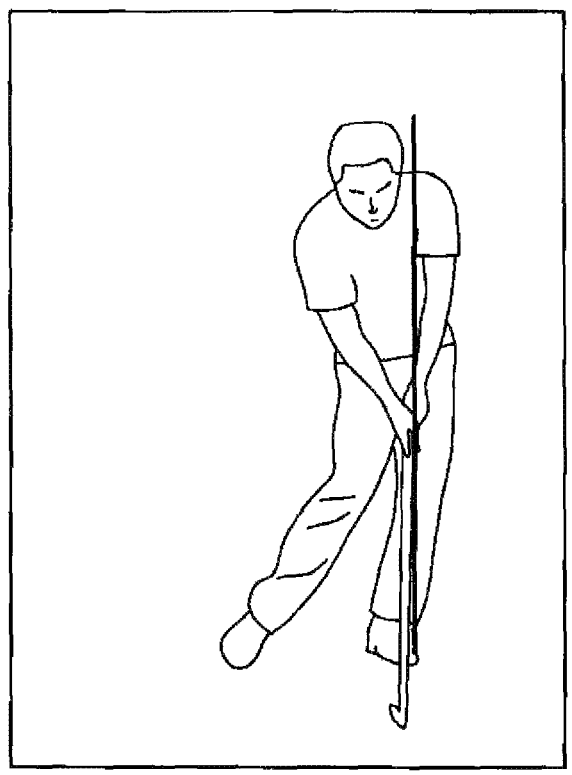
FIG. 26 illustrates an example of the identification of slide through the analysis of the user's motion.

FIG. 26 illustrates an example of the identification of slide through the analysis of the user's motion. "Slide" means any excessive lateral movement of the lower part in the target direction during the impact posture. FIG. 26 illustrates slide, wherein calculation is performed based on the following variables and discriminant:

3D coordinates of left side of pelvis: L
3D coordinates of right side of pelvis: R
3D coordinates of center of pelvis:

$$C = \frac{1}{2}(L+R)$$

3D coordinates of joint of left foot: F
Discriminant: $C_X - F_X > \theta$

Figure 27:
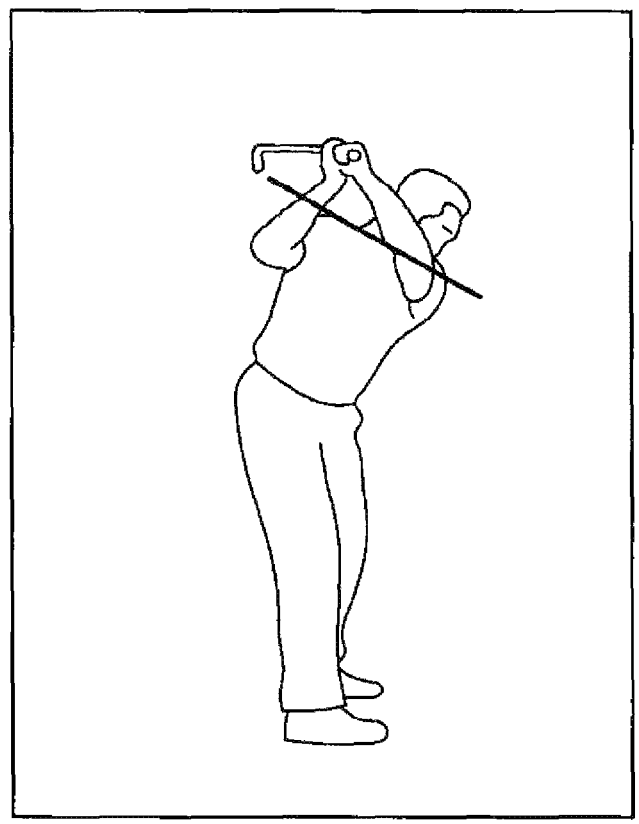
FIGS. 27 and 28 illustrate an example of the identification of a flat shoulder plane through the analysis of the user's motion.
Figure 28:
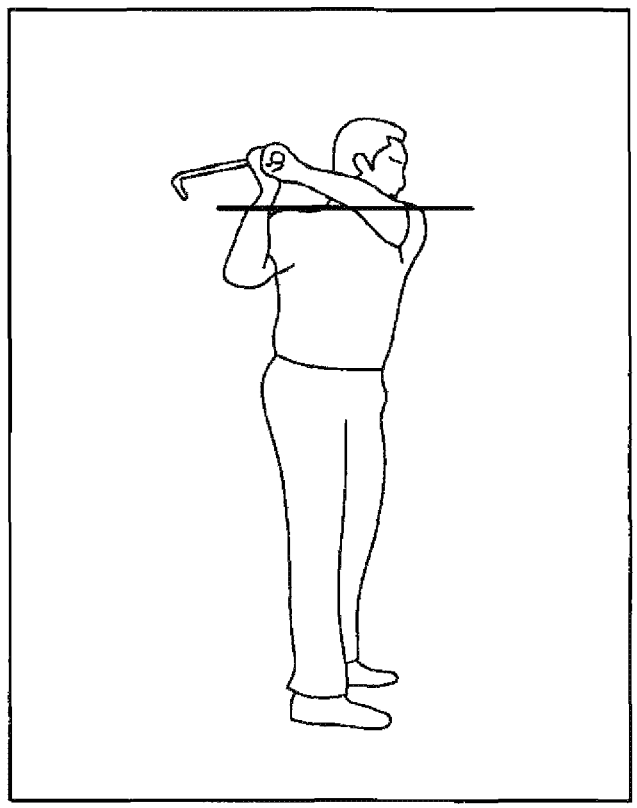

FIGS. 27 and 28 illustrate an example of the identification of a flat shoulder plane through the analysis of the user's motion. "Flat shoulder plane" means the state in which, at the top of the user's backswing, the shoulders are nearly parallel with the ground. FIG. 27 illustrates a correct posture and FIG. 28 illustrates a flat shoulder plane, wherein calculation is performed based on the following variables and discriminant:

3D coordinates of head: H
3D coordinates of center of pelvis: C
3D coordinates of left shoulder: L
3D coordinates of right shoulder: R
Angle between line connecting head and pelvis and line connecting two shoulders:

$$\varphi = \cos^{-1} \frac{(H-C) \cdot (L-R)}{\|H-C\| \|L-R\|}$$

Discriminant: $|\varphi - 90°| > \theta$

Figure 29:
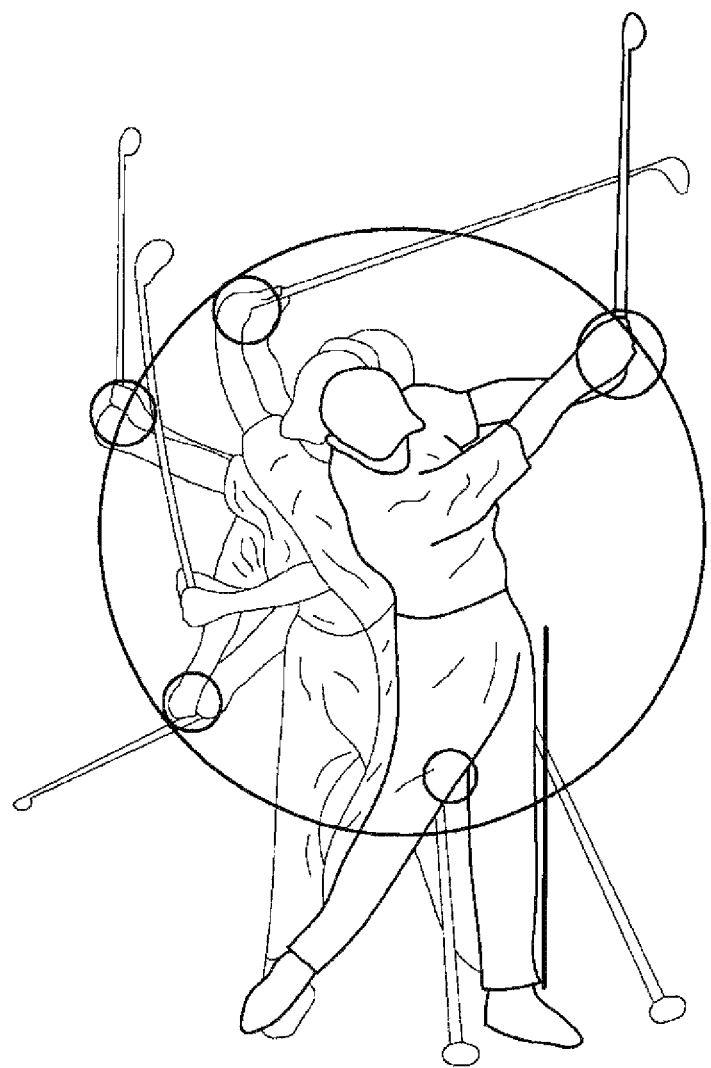
FIG. 29 illustrates an example of the determination of whether a head is fixed through the analysis of the user's motion.

FIG. 29 illustrates an example of the determination of whether a head is fixed, through the analysis of the user's motion. The position of the head must change as little as possible during an address-backswing-backswing top-downswing-impact procedure of golf motion. In FIG. 29, variation in the position of the user's head may be indicated on the position of the user's head, wherein calculation is performed based on the following variables and discriminant:

3D coordinates of head at address time: $H_1$
3D coordinates of head at backswing top time: $H_2$
3D coordinates of head at impact time: $H_3$
Discriminant: $\{\|H_2 - H_1\| < \theta\} \wedge \{\|H_3 - H_1\| < \theta\}$ The golf motion analysis method according to the present invention may be implemented as program instructions that can be executed by various computer means. In this case, the program instructions may be recorded on a computer-readable storage medium. The computer-readable storage medium may include program instructions, data files, and data structures solely or in combination. The program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, for example, magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine language code, such as code created by a compiler, and high-level language code executable by a computer using an interpreter. The hardware devices may be configured to operate as one or more software modules in order to perform the operation of the present invention, and vice versa.

The teaching of the principles of the present invention may be implemented as a combination of hardware and software. Further, software may be implemented as an application program actually implemented in a program storage unit. The application program may be uploaded to a machine including any suitable architecture and may be executed by the machine. Preferably, the machine may be implemented on a computer platform having hardware components, such as one or more Central Processing Units (CPUs), a computer processor, RAM, and Input/Output (I/O) interfaces. Further, the computer platform may include an operating system and micro-instruction code. Various processes and functions described here may be a part of the micro-instruction code, a part of the application program, or any combination thereof, and may be executed by various processing devices including a CPU. In addition, various other peripheral devices such as an additional data storage unit and a printer may be connected to the computer platform.

Since some of the system components and methods illustrated in the attached drawings are preferably implemented using software, it should be additionally understood that actual connections between the system components or process function blocks may vary according to the scheme for programming the principles of the present invention. Here, when the teachings are given, those skilled in the art may take into consideration the principles of the present invention and similar embodiments or configurations thereof.

Hereinafter, the configuration and operation of an apparatus for analyzing a golf motion according to an embodiment of the present invention will be described in detail.

Figure 30:
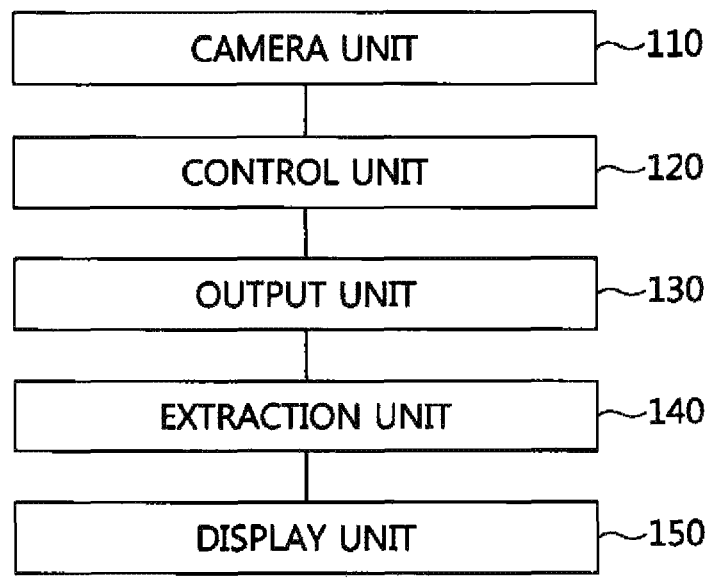
FIG. 30 is a block diagram showing the configuration of an apparatus for analyzing a golf motion according to an embodiment of the present invention.

FIG. 30 is a block diagram showing the configuration of an apparatus for analyzing a golf motion according to an embodiment of the present invention.

Referring to FIG. 30, a golf motion analysis apparatus 100 according to an embodiment of the present invention may include a camera unit 110, a control unit 120, an output unit 130, an extraction unit 140, and a display unit 150. The golf motion analysis apparatus 100 shares the technical description of FIGS. 1 to 29. Below, a description will be made based on the principal technical description.

The camera unit 110 includes an image sensor for acquiring a 2D image of the motion of the user and a depth sensor for acquiring a depth image, which includes depth values of respective pixels in the 2D image, to temporally alternate with the acquisition of the 2D image.

The control unit 120 generates a corresponding depth image or a corresponding 2D image, which corresponds to a reference 2D image or a reference depth image acquired at a predetermined time by the camera unit 110.

The output unit 130 outputs the reference 2D image and the corresponding depth image or the reference depth image and the corresponding 2D image as output data.

The extraction unit 140 extracts the skeletal information of the user through the analysis of the output data.

The display unit 150 displays the motion of the user based on the skeletal information.

Meanwhile, the display unit 150 may display the continuous motion or video of the golf motion of the user by successively displaying 2D images acquired by the camera unit 110.

The control unit 120 may extract a 3D point cloud from each depth image acquired by the camera unit 110, and the display unit 150 may display the 3D point cloud on the screen.

The depth image is a 2D function of D(x,y), which may be defined as a function for causing the physical distance from pixel coordinates (x,y) to an actual object D corresponding to the pixel, to correspond to the pixel.

Here, when camera parameters for the depth image are known, the 3D coordinates of the 3D point corresponding to each pixel may be calculated using the camera parameters.

Assuming that there is a simple pinhole camera model and that the focal length of the camera is f and the pixel coordinates of the principal point of the camera are (px, py), the relationship between the coordinates (X, Y, Z) of a 3D pixel point and the coordinates (x,y) of a 2D pixel point, projected on the depth image, may be represented by the following equation:

$$\begin{bmatrix} x \\ y \\ 1 \end{bmatrix} = S \cdot \begin{bmatrix} f & 0 & px & 0 \\ 0 & f & py & 0 \\ 0 & 0 & 1 & 0 \end{bmatrix} \begin{bmatrix} X \\ Y \\ Z \\ 1 \end{bmatrix}$$

This equation is divided into the following two equations:

$$x = f \cdot \frac{X}{Z} + px$$

$$y = f \cdot \frac{Y}{Z} + py$$

Therefore, given the depth D of the pixel (x,y) of the depth image, the coordinates of the 3D point corresponding to the pixel are calculated as follows:

$$Z = D$$

$$X = \frac{D}{f} \cdot (x - px)$$

$$Y = \frac{D}{f} \cdot (y - py)$$

When the control unit 120 extracts a 3D point cloud through this procedure and transfers the 3D point cloud to the display unit 150, the display unit 150 displays the 3D point cloud on the screen. Here, the display unit 150 may perform control such that the display times of the 3D point cloud are varied according to the user's manipulation input (e.g. mouse input).

In the analysis of a golf motion, information about whether the waist is bent, information about an angle at which the arms are maintained, etc. are very important, which are elements that are difficult to determine using only 2D front images. In accordance with the present invention, the control unit 120 calculates the 3D point cloud, and the display unit 150 visualizes the 3D point cloud, thus enabling the above-described information to be easily delivered to the user.

In accordance with the present invention, there is provided a system for analyzing a golf motion, which enables high-speed image capturing to be efficiently implemented.

Further, the present invention may provide more accurate and various information to a user by extracting skeletal information and precisely analyzing the motion of the user.

Furthermore, the present invention may enable the stable analysis of a fast motion section while providing real-time information to the user, when analyzing a golf swing including a fast motion.

As described above, in the golf motion analysis method according to the present invention, the configurations and schemes in the above-described embodiments are not limitedly applied, and some or all of the above embodiments can be selectively combined and configured so that various modifications are possible.

What is claimed is:

1. A method for analyzing a golf motion, the method comprising:
   acquiring, by an image sensor of a camera, a two-dimensional (2D) image of a motion of a user;
   acquiring, by a depth sensor of the camera, a depth image to temporally alternate with acquisition of the 2D image, the depth image including depth values of respective pixels in the 2D image;
   increasing an image-capturing speed by generating a corresponding depth image or a corresponding 2D image, which corresponds to a reference 2D image or a reference depth image acquired at a predetermined time;
   outputting the reference 2D image and the corresponding depth image or the reference depth image and the corresponding 2D image as output data for motion analysis;

extracting skeletal information of the user through analysis of the output data; and displaying the motion of the user on a display based on the skeletal information.

2. The method of claim 1, wherein increasing the image-capturing speed comprises:
acquiring, by the depth sensor, a first depth image at a first time;
acquiring, by the image sensor, a first 2D image as the reference 2D image at a second time after the first time;
generating a second depth image at the first time by projecting the first depth image on a viewpoint of the image sensor;
estimating, a motion vector between the first 2D image and the second depth image;
rendering a third depth image projected at the second time from the second depth image using the motion vector; and
generating a fourth depth image at the second time as the corresponding depth image by projecting the third depth image on a viewpoint of the depth sensor,
wherein outputting the reference 2D image and the corresponding depth image or the reference depth image and the corresponding 2D image is configured to output the first 2D image and the fourth depth image as output data.

3. The method of claim 1, wherein increasing the image-capturing speed comprises:
acquiring, by the image sensor, a first 2D image at a first time;
acquiring, by the depth sensor, a first depth image as the reference depth image at a second time after the first time;
generating a second depth image by projecting the first depth image on a viewpoint of the image sensor;
estimating a motion vector between the first 2D image, and the second depth image; and
rendering a second 2D image at the second time as the corresponding 2D image from the first 2D image using the motion vector,
wherein outputting the reference 2D image and the corresponding depth image or the reference depth image and the corresponding 2D image is configured to output the first depth image and the second 2D image as output data.

4. The method of claim 1, wherein extracting the skeletal information comprises:
extracting pixel data of the output data;
performing user area setting by selecting pixels in a user area corresponding to the user based on the pixel data;
calculating a probability distribution value indicating whether each of the pixels included in, the user area corresponds to a skeleton joint;
defining predetermined pixels as a skeleton joint based on the probability distribution value;
defining a center point of the predetermined pixels defined as the skeleton joint; and
completing and extracting the skeletal information based on the center point.

5. The method of claim 4, wherein each of defining as the skeleton joint and defining the center point comprises:
decreasing a resolution of the pixel data;
defining a skeleton joint and a center point based on low resolution;
increasing the resolution of the pixel data;
setting an area ranging a predetermined distance from the center point derived based on the low resolution; and
newly defining skeleton joints and a center point based on the pixels in the area.

6. The method of claim 4, wherein the pixel data is at least one of depth information, an RGB value, and an illuminance value of each pixel.

7. The method of claim 1, wherein outputting the reference 2D image and the corresponding depth image or the reference depth image and the corresponding 2D image is configured to adjust an amount of output data for motion analysis according to a motion speed of the user.

8. The method of claim 1, wherein outputting the reference 2D image and the corresponding depth image or the reference depth image and the corresponding 2D image is configured to:
when a motion speed of the user is less than a preset value, output all of the reference 2D image and the corresponding depth image or the reference depth image and the corresponding 2D image in real time as the output data for motion analysis; and
when the motion speed of the user is equal to or greater than the preset value, extract part of the reference 2D image and the corresponding depth image or the reference depth image and the corresponding 2D image, and output the extracted image as the output data for motion analysis.

9. The method of claim 8, wherein outputting the reference 2D image, and the corresponding depth image or the reference depth image and the corresponding 2D image is configured to:
when the motion speed of the user is equal to or greater than the preset value, and then part of the reference 2D image and the corresponding depth image or the reference depth image and the corresponding 2D image is extracted and output as the output data for motion analysis, store remaining data and output the remaining data as the output data for motion analysis when the motion speed of the user is changed to a value less than the preset value.

10. The method of claim 1, wherein displaying the motion of the user is configured to display a motion of the user, differing from a preset reference motion by a predetermined value or more, among motions of the user.

11. A method for analyzing a golf motion, the method comprising:
acquiring, by an image sensor of a camera, a two-dimensional (2D) image of a golf motion of a user;
acquiring, by a depth sensor of the camera, a depth image to temporally alternate with acquisition of the 2D image, the depth image including depth values of respective pixels in the 2D image;
increasing an image-capturing speed by generating a corresponding depth image or a corresponding 2D image, which corresponds to a reference 2D image or a reference depth image acquired at a predetermined time;
extracting skeletal information of the user through analysis based on the 2D image and the depth image; and
displaying positions of joints of the user on a display based on the 2D image and the skeletal information.

12. The method of claim 11, wherein:
extracting the skeletal information is configured to, extract the skeletal information of the user to include skull information of the user, and
displaying the positions of the joints is configured to display movement of a head from an address section to an impact section in a golf motion of the user.

13. The method of claim 11, wherein:

extracting the skeletal information is configured to calculate a value corresponding to a distance between feet based on position values of joints of, ankles of the user through analysis of the output data, and displaying the positions of the joints is configured to display the distance between the feet in a golf motion of the user.

14. The method of claim 11, wherein:

extracting the skeletal information is configured to calculate coordinates of a center of gravity of the user and coordinates of a joint of a right foot or a left foot, and displaying the positions of the joints is configured to display the center of gravity and a position of the joint of the right or left foot during a backswing section or a downswing section in the golf motion of the user.

15. The method of claim 11, wherein:

extracting the skeletal information is configured to calculate a value corresponding to an angle of an arm based on coordinates of joints of shoulders, elbows, and hands, and displaying the positions of the joints is configured to display a line connecting the joints of the shoulders, elbows, and hands during an impact section in the golf motion of the user.

16. The method of claim 11, wherein:

extracting the skeletal information is configured to calculate a value corresponding to a reverse spine angle based on coordinates of the head and left/right sides of a pelvis, and displaying the positions of the joints is configured to display a line connecting a left or right foot and a center of the left/right sides of the pelvis during a backs ng section in the golf motion of the user.

17. The method of claim 11, wherein:

extracting the skeletal information is configured to calculate an angle between a line connecting a head and a pelvis and a line connecting left/right shoulders, based on coordinates of a head, left/right sides of the pelvis, and the left/right shoulders, and displaying the positions of the joints is configured to display the line connecting the head and the pelvis and the line connecting the left/right shoulders during a backswing top section in the golf motion of the user.

18. The method of claim 11, wherein:

extracting the skeletal information is configured to calculate a 3D point cloud based on, pixel data of output data, and displaying the positions of the joints is configured to display the skeletal information as the 3D point cloud on the display.

19. An apparatus for analyzing a golf motion, comprising:

a camera including an image sensor for acquiring a two-dimensional (2D) image of a motion of a user and a depth sensor for acquiring a depth image to temporally alternate with acquisition of the 2D image, the depth image having depth values of respective pixels in the 2D image;

a controller which generates a corresponding depth image or a corresponding 2D image, which corresponds to a reference 2D image or a reference depth image, acquired at a predetermined time by the camera;

an output device which outputs the reference 2D image and the corresponding depth image or the reference depth image and the corresponding 2D image as output data;

an extractor which extracts skeletal information of the user through analysis of the output data; and a display which displays the motion of the user based on the skeletal information.

* * * * *